United States Patent
Nilsson et al.

(10) Patent No.: US 9,365,708 B2
(45) Date of Patent: Jun. 14, 2016

(54) CABLE AND PRODUCTION PROCESS THEREOF

(75) Inventors: Ulf Nilsson, Stenungsund (SE); Annika Smedberg, Myggenas (SE); Alfred Campus, Eysins (CH)

(73) Assignee: BOREALIS AG, Vienna (AT)

( * ) Notice: Subject to any disclaimer, the term of this patent is extended or adjusted under 35 U.S.C. 154(b) by 64 days.

(21) Appl. No.: 13/509,256

(22) PCT Filed: Nov. 3, 2010

(86) PCT No.: PCT/EP2010/066709
§ 371 (c)(1),
(2), (4) Date: Jul. 16, 2012

(87) PCT Pub. No.: WO2011/057925
PCT Pub. Date: May 19, 2011

(65) Prior Publication Data
US 2012/0273253 A1    Nov. 1, 2012

(30) Foreign Application Priority Data
Nov. 11, 2009   (EP) .................................... 09175692

(51) Int. Cl.
*B05D 5/12*     (2006.01)
*C08F 210/00*   (2006.01)
*C08F 110/02*   (2006.01)
*C08L 23/06*    (2006.01)
*C08F 6/00*     (2006.01)
*C08F 210/02*   (2006.01)
(Continued)

(52) U.S. Cl.
CPC ............. *C08L 23/06* (2013.01); *C08F 6/001* (2013.01); *C08F 210/02* (2013.01); *H01B 3/441* (2013.01); *C08F 110/02* (2013.01); *C08K 3/04* (2013.01); *C08K 5/005* (2013.01); *C08K 5/01* (2013.01); *C08K 5/14* (2013.01); *C08L 2203/202* (2013.01); *C08L 2205/02* (2013.01); *C08L 2308/00* (2013.01)

(58) Field of Classification Search
CPC ........ C08F 6/001; C08F 10/00; C08F 210/02; H01B 3/30; H01B 3/18; C08L 23/08; C08L 23/06; C08L 2308/00; C08L 2205/02; C08L 2203/202
USPC .................... 427/122; 174/120; 526/348, 352
See application file for complete search history.

(56) References Cited

U.S. PATENT DOCUMENTS 3,098,893 A * 7/1963 Pringle et al. ........... 174/102 SC
3,717,720 A   2/1973 Snellman
(Continued)

FOREIGN PATENT DOCUMENTS

DE    17 69 723 A1    2/1972
EP    0 150 610 A2    8/1985
(Continued)

OTHER PUBLICATIONS

International Search Report and Written Opinion issued on Nov. 30, 2010 for International Application No. PCT/EP2010/066709.
(Continued)

*Primary Examiner* — William Cheung
(74) *Attorney, Agent, or Firm* — Knobbe, Martens, Olson & Bear, LLP

(57) ABSTRACT

A cable comprising a semiconductive layer and an insulation layer with improved DC electrical properties is provided.

22 Claims, 1 Drawing Sheet

(51) Int. Cl.
*H01B 3/44* (2006.01)
*C08K 3/04* (2006.01)
*C08K 5/00* (2006.01)
*C08K 5/01* (2006.01)
*C08K 5/14* (2006.01)

(56) References Cited

U.S. PATENT DOCUMENTS

| | | |
|---|---|---|
| 4,049,757 A | 9/1977 | Kammel et al. |
| 4,721,761 A | 1/1988 | Omae et al. |
| 4,813,221 A | 3/1989 | Christian |
| 5,246,783 A | 9/1993 | Spenadel |
| 5,461,850 A | 10/1995 | Bruyneel |
| 5,539,075 A | 7/1996 | Gustafsson et al. |
| 5,554,826 A | 9/1996 | Gentry |
| 5,556,697 A | 9/1996 | Flenniken |
| 5,661,965 A | 9/1997 | Yanagisawa |
| 5,718,947 A | 2/1998 | Martin |
| 5,731,082 A | 3/1998 | Gross |
| 5,822,973 A | 10/1998 | Kaneko |
| 5,852,135 A | 12/1998 | Kanai et al. |
| 6,140,589 A | 10/2000 | Blackmore |
| 6,231,978 B1 | 5/2001 | Keogh |
| 6,302,175 B1 | 10/2001 | Shoyama |
| 6,559,385 B1 | 5/2003 | Johnson |
| 7,473,742 B2 | 1/2009 | Easter |
| 8,831,389 B2 | 9/2014 | McCullough |
| 2001/0030053 A1 | 10/2001 | Gadessaud et al. |
| 2002/0022687 A1 | 2/2002 | Hikita et al. |
| 2002/0034689 A1 | 3/2002 | Hoshida et al. |
| 2002/0042451 A1 | 4/2002 | Sugaya |
| 2002/0127401 A1 | 9/2002 | Perego et al. |
| 2004/0108038 A1 | 6/2004 | Cordonnier |
| 2004/0138351 A1 | 7/2004 | Kaprinidis et al. |
| 2004/0210002 A1 | 10/2004 | Haekoenen et al. |
| 2005/0279074 A1 | 12/2005 | Johnson |
| 2006/0055075 A1 | 3/2006 | Hoshida et al. |
| 2006/0102377 A1 | 5/2006 | Johnson |
| 2006/0116279 A1 | 6/2006 | Kogoi et al. |
| 2006/0151758 A1 | 7/2006 | Reyes |
| 2006/0191619 A1 | 8/2006 | Meersschaut |
| 2006/0249705 A1 | 11/2006 | Wang et al. |
| 2007/0000682 A1 | 1/2007 | Varkey |
| 2007/0044992 A1 | 3/2007 | Bremnes |
| 2007/0048472 A1 | 3/2007 | Krishnaswamy et al. |
| 2007/0205009 A1 | 9/2007 | Figenschou |
| 2007/0253778 A1 | 11/2007 | Figenschou |
| 2007/0299173 A1 | 12/2007 | Wolfschwenger et al. |
| 2008/0124521 A1 | 5/2008 | Niino |
| 2008/0227887 A1 | 9/2008 | Klier |
| 2008/0315159 A1 | 12/2008 | Minagoshi |
| 2009/0045908 A1 | 2/2009 | Tanaka et al. |
| 2009/0227717 A1 | 9/2009 | Smedberg et al. |
| 2009/0238957 A1 | 9/2009 | Clancy |
| 2009/0280282 A1 | 11/2009 | Doty et al. |
| 2010/0038112 A1 | 2/2010 | Grether |
| 2010/0059249 A1 | 3/2010 | Powers |
| 2010/0086268 A1 | 4/2010 | Reyes |
| 2010/0293783 A1 | 11/2010 | Goldsworthy |
| 2010/0300592 A1 | 12/2010 | Miyazaki |
| 2011/0042624 A1 | 2/2011 | Minagoshi |
| 2011/0196078 A1 | 8/2011 | Wolfschwenger et al. |
| 2012/0163758 A1 | 6/2012 | McCullough |
| 2012/0170900 A1 | 7/2012 | Fancher |
| 2012/0298403 A1 | 11/2012 | Johnson |

FOREIGN PATENT DOCUMENTS

| | | |
|---|---|---|
| EP | 0 463 402 A2 | 1/1992 |
| EP | 0517868 | 11/1995 |
| EP | 0688794 B1 | 8/1998 |
| EP | 0887355 A1 | 12/1998 |
| EP | 1168469 A2 | 1/2002 |
| EP | 11211289 A1 | 6/2002 |
| EP | 0810235 B1 | 11/2004 |
| EP | 1484345 A1 | 12/2004 |
| EP | 1669403 A1 | 6/2006 |
| EP | 1695996 A1 | 8/2006 |
| EP | 1731564 B1 | 3/2010 |
| JP | 2018811 | 1/1990 |
| JP | 2272031 A | 11/1990 |
| JP | 05279578 A | 10/1993 |
| JP | 05-062529 | 12/1993 |
| JP | 05-298927 | 12/1993 |
| JP | 06-251624 | 9/1994 |
| JP | 06-251625 | 9/1994 |
| JP | 7021850 A | 1/1995 |
| JP | 08-059720 A | 3/1996 |
| JP | 09-306265 | 11/1997 |
| JP | H10-259212 A | 9/1998 |
| JP | 10-283851 | 10/1998 |
| JP | 2000-053815 A | 2/2000 |
| JP | 2001-04148 | 2/2001 |
| JP | 2001-501660 | 2/2001 |
| JP | 2006-291022 A | 10/2006 |
| JP | 2006291022 A | 10/2006 |
| WO | 93/08222 A1 | 4/1993 |
| WO | 98/14537 | 4/1998 |
| WO | 98/14537 A1 | 4/1998 |
| WO | 9920690 A1 | 4/1999 |
| WO | 0025324 A1 | 5/2000 |
| WO | 0137289 A1 | 5/2001 |
| WO | 03000754 A1 | 1/2003 |
| WO | 2004041919 A2 | 5/2004 |
| WO | 2006/089744 A1 | 8/2006 |
| WO | 2006-089793 A1 | 8/2006 |
| WO | 2006081400 A2 | 8/2006 |
| WO | 2006/131264 A1 | 12/2006 |
| WO | 2006/131266 A1 | 12/2006 |
| WO | 2008070022 A1 | 6/2008 |
| WO | 2009/000326 A1 | 12/2008 |
| WO | 2009/002653 A1 | 12/2008 |
| WO | 2009/012041 A1 | 1/2009 |
| WO | 2009/012092 A1 | 1/2009 |
| WO | 2009007116 A1 | 1/2009 |
| WO | 2009007117 A1 | 1/2009 |
| WO | 2009007118 A1 | 1/2009 |
| WO | 2009007119 A2 | 1/2009 |
| WO | 2009/056409 A1 | 5/2009 |
| WO | 2010/003650 A1 | 1/2010 |
| WO | 2011/057926 A1 | 5/2011 |
| WO | 2011/057927 A1 | 5/2011 |

OTHER PUBLICATIONS

International Search Report and Written Opinion issued on Dec. 6, 2010 for International Application No. PCT/EP2010/066711.

International Search Report and Written Opinion issued on Dec. 2, 2010 for international Application No. PCT/EP2010/066712.

International Search Report dated Apr. 26, 2012 for International Application No. PCT/EP2011/069182.

International Search Report dated Dec. 9, 2010 for International Application No. PCT/EP2010/066710.

Smedberg et al. "Effect of molecular structure and topology on network formation in peroxide crosslinked polyethylene", Polymer 44 (2003) 3395-3405.

International Search Report for PCT/EP2011/053025, mailed Aug. 11, 2011.

Shamiri et al., "The influence of Ziegler-Natta and metallocene Catalysts on Polyolefin structure, properties, and processing ability," Materials 7 (2014) 5069-5108.

Machine translation of JP 2001-501660A; publication date Feb. 2001.

Primol 352 Product Information Sheet, 3 pages (Copyright 2001-2014 Exxon Mobile Corp.

Office Action dated Jan. 5, 2015 for JP2013-537116 (English translation).

U.S. Appl. No. 13/509,252, filed Jul. 31, 2012, including its prosecution history, the references and the Office Actions therein.

(56) References Cited

OTHER PUBLICATIONS

U.S. Appl. No. 13/509,257, filed Jul. 31, 2012, including its prosecution history, the references and the Office Actions therein.
U.S. Appl. No. 13/509,268, filed Aug. 3, 2012, including its prosecution history, the references and the Office Actions therein.
U.S. Appl. No. 13/883,271, filed Jul. 12, 2013, including its prosecution history, the references and the Office Actions therein.
Communication dated Aug. 19, 2015 for EP Application 10771773.8.
Global high voltage solutions, Dow Wire & Cable, Published Aug. 2008, The Dow Chemical Company.
Declaration of Dr Timothy J. Person dated Oct. 6, 2015 with attachments including the invoice 09/45106196 of Aug. 7, 2008, (2) the certificate of analysis 3802244 dated Aug. 7, 2008, (3) the invoice 09/45105512 of Jul. 24, 2008 and (4) the certificate of analysis 3783325 dated Jul. 24, 2008.
Declaration of Mr Kent Neuvar with attachment dated Oct. 6, 2015 including MSDS Ideal EC 631.
Experimental report Dr Dachao Li dated Oct. 6, 2015.
Rudnick, Leslie and Ronald Shukbin, Synthetic Lubricants and High-performance Functional fluids, Revised and Expanded, CRC Press, 1999, p. 376-377.
Communication of a Notice of Opposition dated Oct. 19, 2015 for EP 10773622.5.
Communication of a Notice of Opposition dated Dec. 16, 2015 for EP 10771774.6.
Declaration and Test Report on Carbon-Carbon Unsaturation of DXM-446 LDPE of Dr Timothy J. Person dated Dec. 8, 2015.
Test Report on Preparing the Plaques for Electrical Conductivity Testing dated Dec. 7, 2015.
Test Report Shanghai Electric Cable Institute R&D Center—English Version.
Olsson et al., Experimental Determination of DC Conductivity of XPLE Insulation, Nording Insulation Symposium 2009 (Nord-IS 09), Jun. 15, 2009, 55-58.
R. Bodega, Space Charge Accumulation in Polymeric High Voltage DC Cable Systems, Thesis, Technical University Delft, ISBN 90-8559-228-3, 2006 pp. vii-xii, 9-12, 75-89.

* cited by examiner

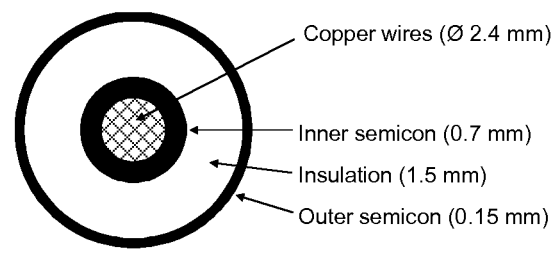

CABLE AND PRODUCTION PROCESS THEREOF

CROSS REFERENCE TO RELATED APPLICATIONS

This application is the U.S. National Phase of International Application No. PCT/EP2010/066709, filed Nov. 3, 2010, designating the U.S. and published as WO 2011/057925 on May 19, 2011 which claims the benefit of European Patent Application No. 09175692.4 filed Nov. 11, 2009.

FIELD OF INVENTION

The invention concerns a cable comprising at least one semiconductive layer and at least one insulation layer suitable for power cable, preferably for direct current (DC) power cable, applications and to a process for producing the cable.

BACKGROUND ART

Polyolefins produced in a high pressure (HP) process are widely used in demanding polymer applications wherein the polymers must meet high mechanical and/or electrical requirements. For instance in power cable applications, particularly in medium voltage (MV) and especially in high voltage (HV) and extra high voltage (EHV) cable applications the electrical properties of the polymer composition has a significant importance. Furthermore, the requirement for the electrical properties may differ in different cable applications, as is the case between alternating current (AC) and direct current (DC) cable applications.

A typical power cable comprises a conductor surrounded, at least, by an inner semiconductive layer, an insulation layer and an outer semiconductive layer, in that order.

Space Charge

There is a fundamental difference between AC and DC with respect to electrical field distribution in the cable. The electric field in an AC cable is easily calculated since it depends on one material property only, namely the relative permittivity (the dielectric constant) with a known temperature dependence. The electric field will not influence the dielectric constant. On the other hand, the electric field in a DC cable is much more complex and depends on the conduction, trapping and build-up of electric charges, so called space charges, inside the insulation. Space charges inside the insulation will distort the electric field and may lead to points of very high electric stress, possibly that high that a dielectric failure will follow.

Preferably there should be no space charges present as it will make it possible to easily design the cable as the electric field distribution in the insulation will be known.

Normally space charges are located close to the electrodes; charges of the same polarity as the nearby electrode are called homocharges, charges of opposite polarity are called heterocharges. The heterocharges will increase the electric field at this electrode, homocharges will instead reduce the electric field.

Electrical Conductivity

The DC electrical conductivity is an important material property e.g. for insulating materials for HV DC cables. First of all, the strong temperature and electric field dependence of this property will influence the electric field distribution via space charge build-up as described above. The second issue is the fact that heat will be generated inside the insulation by the electric leakage current flowing between the inner and outer semiconductive layers. This leakage current depends on the electric field and the electric conductivity of the insulation. High conductivity of the insulating material can even lead to thermal runaway under high stress/high temperature conditions. The conductivity must therefore be kept sufficiently low to avoid thermal runaway.

Compressor Lubricants

HP process is typically operated at high pressures up to 4000 bar. In known HP reactor systems the starting monomer(s) need to be compressed (pressurised) before introduced to the actual high pressure polymerisation reactor. Compressor lubricants are conventionally used in the hypercompressor(s) for cylinder lubrication to enable the mechanically demanding compression step of starting monomer(s). It is well known that small amounts of the lubricant normally leaks through the seals into the reactor and mixes with the monomer(s). In consequence the reaction mixture contains traces (up to hundreds of ppm) of the compressor lubricant during the actual polymerisation step of the monomer(s). These traces of compressor lubricants can have an effect on the electrical properties of the final polymer.

As examples of commercial compressor lubricants e.g. polyalkylene glycol (PAG): R—$[C_xR_yH_z$—$O]_n$—H, wherein R can be H or straight chain or branched hydrocarbyl and x, y, x, n are independent integers that can vary in a known manner, and lubricants based on a mineral oil (by-product in the distillation of petroleum) can be mentioned. Compressor lubricants which are based on mineral oils that meet the requirements set for the white mineral oil in European Directive 2002/72/EC, Annex V, for plastics used in food contact, are used e.g. for polymerising polymers especially for the food and pharmaceutical industry. Such mineral oil-based lubricants contain usually lubricity additive(s) and may also contain other type of additive(s), such as antioxidants.

WO2009012041 of Dow discloses that in high pressure polymerisation process, wherein compressors are used for pressurising the reactants, i.e. one or more monomer(s), the compressor lubricant may have an effect on the properties of the polymerised polymer. The document describes the use of a polyol polyether which comprises one or none hydroxyl functionality as a compressor lubricant for preventing premature crosslinking particularly of silane-modified HP polyolefins. WO2009012092 of Dow discloses a composition which comprises a HP (i) polyolefin free of silane functionality and (ii) a hydrophobic polyether polyol of PAG type wherein at least 50% of its molecules comprise no more than a single hydroxyl functionality. The component (ii) appears to originate from a compressor lubricant. The composition is i.a. for W&C applications and is stated to reduce dielectrical losses in MV and HV power cables, see page 2, paragraph 0006. In both applications it is stated that hydrophilic groups (e.g. hydroxyl groups) present in the compressor lubricant can result in increased water uptake by the polymer which in turn can increase electrical losses or, respectively, pre-mature scorch, when the polymer is used as a cable layer material. The problems are solved by a specific PAG type of lubricant with reduced amount of hydroxyl functionalities.

There is a continuous need in the polymer field to find polymers which are suitable for demanding polymer applications such as wire and cable applications with high requirements and stringent regulations.

SUMMARY

One of the objects of the present invention is to provide an alternative cable, particularly a power cable with highly advantageous properties useful for alternating current (AC) or direct current (DC) cable applications, preferably for DC cable applications.

Furthermore the invention provides a use of an alternative polymer composition in an insulation layer in contact with a semiconductive layer comprising a carbon black, whereby highly advantageous properties for use in alternating current (AC) or direct current (DC) cable applications, preferably in DC cable applications, are provided.

The invention and further objects thereof are described and defined in details below.

BRIEF DESCRIPTION OF THE DRAWINGS

FIG. 1 describes the three-layer model cable used with insulation thickness of 1.5 mm used in DC conductivity determination Method 4.

DESCRIPTION OF CERTAIN ILLUSTRATIVE EMBODIMENTS

As the first invention, the present invention provides a cable comprising a conductor surrounded by at least one semiconductive layer and an insulation layer, in any order, wherein the semiconductive layer comprises a semiconductive composition comprising carbon black, and the insulation layer comprises a polymer composition comprising a polyolefin, characterized in that (i) the polymer composition of the insulation layer has an electrical conductivity of 150 fS/m or less, when measured at 70° C. and 30 kV/mm mean electric field from a non-degassed, 1 mm thick plaque sample consisting of a crosslinked polymer composition according to DC conductivity method (1) as described under "Determination methods".

The advantageous electrical conductivity of the polymer composition of the insulation layer, which contributes to the advantageous electrical properties of the cable of the invention, is characterized and expressed herein using DC conductivity method (1) as defined in claim 1 and described under "DC Conductivity Determination methods" in below "Determination methods" part. The preferable embodiments of the invention are defined with further conductivity definitions according to DC conductivity method (2) to (4) as described under "DC Conductivity Determination methods" in below "Determination methods" part. DC conductivity method (1) (definition (i)) above and method (2) below describe the electrical conductivity of the polymer composition of the insulation layer measured from a crosslinked plaque sample. DC conductivity method (3) (definition (ii)) and DC conductivity method (4) below characterise the electrical conductivity property of the crosslinked polymer composition of the insulation layer of the cable measured from a model cable in the presence of a semiconductive layer of the cable. Methods (3) and (4) indicate the electrical current leakage property of the insulation layer in a cable.

The polymer composition of the insulation layer of invention is also referred herein as "Polymer composition" or "polymer composition". The polyolefin of the polymer composition of the insulation layer is referred herein also as "polyolefin". The cable of the invention is also referred herein shortly as "Cable". The semiconductive composition of the semiconductive layer of the Cable is referred herein also as "Semiconductive composition".

The term "conductor" means herein above and below that the conductor comprises one or more wires. Moreover, the cable may comprise one or more such conductors. The conductor is an electrical conductor.

The unexpectedly low electrical conductivity contributed by the polymer composition to the cable is very advantageous for power cables, preferably for direct current (DC) power cables. The invention is particularly advantageous for DC power cables.

The Polymer composition is preferably produced in a high pressure (HP) process. As well known the high pressure reactor system typically comprises a compression zone for a) compressing one or more starting monomer(s) in one or more compressor(s) which are also known as hyper-compressor(s), a polymerisation zone for b) polymerising the monomer(s) in one or more polymerisation reactor(s) and a recovery zone for c) separating unreacted products in one or more separators and for recovering the separated polymer. Moreover, the recovery zone of the HP reactor system typically comprises a mixing and pelletising section, such as pelletising extruder, after the separator(s), for recovering the separated polymer in form of pellets. The process is described in more details below.

It has now surprisingly been found that when in a HP reactor system for compressing the starting monomer(s) a compressor lubricant comprising a mineral oil is used in compressors for cylinder lubrication, then the resulting polyolefin has highly advantageous electrical properties such as reduced electrical conductivity which contributes to the excellent electrical properties of the Cable. This is unexpected, since mineral oils are conventionally used for producing polymers for medical and food industry, wherein health aspects are of concern, not the reduced conductivity as required for W&C applications.

Compressor lubricant means herein a lubricant used in compressor(s), i.e. in hypercompressor(s), for cylinder lubrication.

Accordingly, a second invention a cable is independently provided which comprises a conductor surrounded by at least one semiconductive layer and an insulation layer, in any order, wherein the semiconductive layer comprises a semiconductive composition comprising carbon black, and the insulation layer comprises a polymer composition comprising a polyolefin, wherein the polyolefin of the Polymer composition is obtainable by a high pressure process comprising (a) compressing one or more monomer(s) under pressure in a compressor, using a compressor lubricant for lubrication, (b) polymerising a monomer optionally together with one or more comonomer(s) in a polymerisation zone, (c) separating the obtained polyolefin from the unreacted products and recovering the separated polyolefin in a recovery zone, wherein in step a) the compressor lubricant comprises a mineral oil.

The expressions "obtainable by the process" or "produced by the process" are used herein interchangeably and mean the category "product by process", i.e. that the product has a technical feature which is due to the preparation process.

The unifying technical feature common to the first and second cable inventions is the reduced electrical conductivity of the Polymer composition which feature can be expressed by means of the electrical conductivity or, equally alternatively, by means of product-by-process.

"Reduced" or "low" electrical conductivity as used herein interchangeably mean that the value obtained from the DC conductivity method is low, i.e. reduced.

More preferably, the Cable of the invention has the properties of the first and second invention, i.e. comprises a conductor surrounded by at least one semiconductive layer and an insulation layer, in any order, wherein the semiconductive layer comprises a semiconductive composition comprising carbon black, and
the insulation layer comprises a polymer composition comprising a polyolefin, wherein (i) the polymer composition of the insulation layer has an electrical conductivity of 150 fS/m or less, when measured at 70° C. and 30 kV/mm mean electric field from a non-degassed, 1 mm thick plaque sample consisting of a crosslinked polymer composition according to DC conductivity method (1) as described under "Determination methods"; and
wherein the polyolefin of the Polymer composition is obtainable by a high pressure process comprising
(a) compressing one or more monomer(s) under pressure in a compressor, using a compressor lubricant for lubrication,
(b) polymerising a monomer optionally together with one or more comonomer(s) in a polymerisation zone,
(c) separating the obtained polyolefin from the unreacted products and recovering the separated polyolefin in a recovery zone,
wherein in step a) the compressor lubricant comprises a mineral oil.

The first and second cable inventions are commonly referred herein as the Cable.

Electric power cables, especially medium voltage, high voltage and extra high voltage cables, typically, and preferably, comprise two semiconductive layers and one insulation layer.

Said Cable comprises preferably a conductor surrounded by at least a semiconductive layer and an insulation layer, in that order. More preferably, the Cable comprises a conductor surrounded by an inner semiconductive layer, an insulation layer and optionally, and preferably, an outer semiconductive layer, in that order, as defined above. More preferably, at least the inner semiconductive layer comprises the Semiconductive composition. Preferably also the outer semiconductive layer comprises the Semiconductive composition.

It is evident to a skilled person that the Cable can optionally comprise one or more other layer(s) comprising one or more screen(s), a jacketing layer(s) or other protective layer(s), which layer(s) are conventionally used in of W&C field.

The Semiconductive composition comprises preferably a polyolefin (2) and said carbon black.

The insulation layer of the Cable is preferably crosslinkable. Moreover, at least the inner semiconductive layer of the Cable is optionally, and preferably, crosslinkable. The preferable outer semiconductive layer of the Cable, may be crosslinkable or non-crosslinkable, depending on the end application. Moreover, the outer semiconductive layer of the Cable, if present, may be bonded or strippable, which terms have a well known meaning in the field. Preferably the optional and preferable outer semiconductive layer is bonded and crosslinkable.

The Polymer and/or Semiconductive composition of the Cable may comprise further component(s), such as further polymer component(s) and/or one or more additive(s). Moreover, the Polymer composition with the electric conductivity as defined above or below or the Semiconductive composition, or both, can be crosslinked.

Accordingly, the cable according to the present invention comprises layers made from a Semiconductive composition and a Polymer composition. These compositions preferably are crosslinkable. "Crosslinkable" means that the cable layer can be crosslinked before the use in the end application thereof. In crosslinking reaction of a polymer interpolymer crosslinks (bridges) are primarily formed. Crosslinking can be effected by free radical reaction using irradiation or preferably using a crosslinking agent, which is typically a free radical generating agent, or by the incorporation of crosslinkable groups into polymer component(s), as known in the art. Moreover, the crosslinking step of one or both of the Polymer composition and the Semiconductive composition is typically carried out after the formation of the Cable. It is preferred that at least the Polymer composition of the insulation layer is crosslinked before the end use of the cable.

The free radical generating crosslinking agent can be a radical forming crosslinking agent which contains at least one —O—O— bond or at least one —N=N— bond. More preferably, the crosslinking agent is a peroxide, whereby the crosslinking is preferably effected using a well known peroxide crosslinking technology that is based on free radical crosslinking and is well described in the field. The peroxide can be any suitable peroxide, e.g. such conventionally used in the field.

As mentioned above crosslinking may also be achieved by incorporation of crosslinkable groups, preferably hydrolysable silane groups, into the polymer component(s) of any of the Semiconductive and/or Polymer composition. The hydrolysable silane groups may be introduced into the polymer by copolymerisation of e.g. ethylene monomers with silane group containing comonomers or by grafting with silane groups containing compounds, i.e. by chemical modification of the polymer by addition of silane groups mostly in a radical reaction. Such silane groups containing comonomers and compounds are well known in the field and are e.g. commercially available. The hydrolysable silane groups are typically then crosslinked by hydrolysis and subsequent condensation in the presence of a silanol-condensation catalyst and $H_2O$ in a manner known in the art. Also silane crosslinking technique is well known in the art. If silane crosslinking groups are used, then these are typically used in a semiconductive composition.

Preferably, the crosslinkable Polymer composition of the insulation layer comprises crosslinking agent(s), preferably free radical generating agent(s), more preferably peroxide. Accordingly, the crosslinking of at least the insulation layer, and optionally, and preferably, of the at least one semiconductive layer, is preferably carried out by free radical reaction using one or more free radical generating agents, preferably peroxide(s).

When the preferable peroxide is used as a crosslinking agent, then the crosslinking agent is preferably used in an amount of less than 10 wt %, more preferably in an amount of between 0.2 to 8 wt %, still more preferably in an amount of 0.2 to 3 wt % and most preferably in an amount of 0.3 to 2.5 wt % with respect to the total weight of the composition to be cross-linked.

The preferred crosslinking agent is peroxide. Non-limiting examples are organic peroxides, such as di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl)benzene, 2,5-dimethyl-2,5-di(benzoylperoxy)hexane, 1,1-di(tert-butylperoxy)cyclohexane, 1,1-di(tert amylperoxy)cyclohexane, or any mixtures thereof. Preferably, the peroxide is selected from 2,5-di(tert-butylperoxy)-2,5-dimethylhexane, di(tert-butylperoxyisopropyl)benzene, dicumylperoxide, tert-butylcumylperoxide, di(tert-butyl)peroxide, or mixtures thereof. Most preferably, the peroxide is dicumylperoxide.

Preferably, the Cable is characterised in that the Polymer composition has (i) an electrical conductivity of 140 fS/m or less, preferably of 130 fS/m or less, preferably of 120 fS/m or less, preferably of 100 fS/m or less, preferably from 0.01 to 90 fS/m, more preferably from 0.05 to 90 fS/m, more preferably from 0.1 to 80 fS/m, more preferably from 0.5 to 75 fS/m, when measured at 70° C. and 30 kV/mm mean electric field from a non-degassed, 1 mm thick plaque sample consisting of a crosslinked polymer composition according to DC conductivity method (1) as described under "Determination methods". In this embodiment, the Polymer composition has also preferably (ia) an electrical conductivity of 140 fS/m or less, preferably of 130 fS/m or less, preferably of 60 fS/m or less, preferably from 0.01 to 50 fS/m, more preferably from 0.05 to 40 fS/m, more preferably from 0.1 to 30 fS/m, when measured at 70° C. and 30 kV/mm mean electric field from a degassed plaque, 1 mm thick sample consisting of a crosslinked polymer composition according to DC conductivity method (1) as described under "Determination methods".

In the preferred crosslinked embodiments the electrical conductivity contributed by the insulation layer is surprisingly low even without removing the volatile by-products after crosslinking, i.e. without degassing. Accordingly, if desired the degassing step during the cable production can be shortened.

In a preferable embodiment of the invention, the polymer composition of the insulation layer is characterized by
(ii) an electrical conductivity of 1300 fS/m or less, when determined from a model cable sample of the polymer composition as an insulation layer of a thickness of 5.5 mm and of the semiconductive composition as a semiconductive layers, and measured at 70° C. and 27 kV/mm mean electric field according to DC conductivity method (3) as described under "Determination methods". More preferably the polymer composition of the insulation layer is characterized by (ii) an electrical conductivity of 1000 fS/m or less, preferably of 700 fS/m or less, preferably of 500 fS/m or less, more preferably from 0.01 to 400 fS/m, when determined from a model cable sample of the polymer composition as an insulation layer of a thickness of 5.5 mm and the semiconductive composition as a semiconductive layer, and measured at 70° C. and 27 kV/mm mean electric field according to DC conductivity method (3) as described under "Determination methods".

Further preferably, the Polymer composition has an electrical conductivity of 0.27 fS/m or less, preferably of 0.25 f/Sm or less, more preferably from 0.001 to 0.23 fS/m, when measured at 20° C. and 40 kV/mm mean electric field from a degassed, 0.5 mm thick plaque sample consisting of a crosslinked polymer composition according to DC conductivity method (2) as described under "Determination methods".

Further preferably, the Polymer composition of the Cable is characterised by an electrical conductivity of 0.15 fS/m or less, preferably of 0.14 fS/m or less, preferably of from 0.001 to 0.13 fS/m or less, when determined from a model cable sample of the polymer composition as an insulation layer of a thickness of 1.5 mm and the semiconductive composition as a semiconductive layer, when measured at 20° C. and 40 kV/mm mean electric field according to DC conductivity method (4) as described under "Determination methods".

Accordingly, the electrical properties defined using the above methods (1) to (4) are measured using a sample of the polymer composition of the insulation layer after crosslinking it with a crosslinking agent. The amount of the crosslinking agent can vary. Preferably, in these test methods peroxide is used and the amount of peroxide can vary between 0.3 to 2.5 wt % with respect to the total weight of the composition to be cross-linked. The respective sample preparation of the crosslinked polymer composition is described below under the "Determination methods". It is evident that the non-crosslinked polymer composition of the insulation layer has also the advantageous low electrical conductivity, the given determination methods are only used as one means to characterise and define the electrical conductivity property of the polymer composition and thus of the Cable.

In addition to crosslinking agent(s) as optional additives the Semiconductive and/or Polymer composition may contain further additive(s), such as antioxidant(s), stabiliser(s), water tree retardant additive(s), processing aid(s), scorch retarder(s), metal deactivator(s), crosslinking booster(s), flame retardant additive(s), acid or ion scavenger(s), inorganic filler(s), voltage stabilizer(s) or any mixtures thereof. As non-limiting examples of antioxidants e.g. sterically hindered or semi-hindered phenols, aromatic amines, aliphatic sterically hindered amines, organic phosphites or phosphonites, thio compounds, and mixtures thereof, can be mentioned.

In a more preferable embodiment of the Cable the Polymer composition of the insulation layer comprises free radical generating agent(s) and one or more antioxidant(s) as defined above, whereby as non-limiting examples of thio compounds, for instance
1. sulphur containing phenolic antioxidant(s), preferably selected from thiobisphenol(s), the most preferred being 4,4'-thiobis(2-tertbutyl-5-methylphenol) (CAS number: 96-69-5), 2,2'-thiobis(6-t-butyl-4-methylphenol), 4,4'-thiobis(2-methyl-6-t-butylphenol), thiodiethylene bis[3-(3,5-di-tert-butyl-4-hydroxyphenyl)propionate, or 4,6-bis(octylthiomethyl)-o-cresol (CAS: 110553-27-0) or derivatives thereof; or any mixtures thereof,
2. Other thio compounds like di-stearyl-thio-dipropionate or similar compounds with various length on the carbon chains; or mixtures thereof,
3. or any mixtures of 1) and 2), can be mentioned.
Group 1) above is the preferred antioxidant(s) for the Polymer composition of the insulation layer.

In this preferable embodiment of the Cable the amount of an antioxidant is preferably from 0.005 to 2.5 wt-% based on the weight of the Polymer composition. The antioxidant(s) are preferably added in an amount of 0.005 to 2 wt-%, more preferably 0.01 to 1.5 wt-%, more preferably 0.03 to 0.8 wt-%, even more preferably 0.04 to 1.2 wt-%, based on the weight of the Polymer composition.

In a further preferable embodiment of the Cable, the Polymer composition of the insulation layer comprises free radical generating agent(s), one or more antioxidant(s) and one or more scorch retarder(s).

The scorch retarder (SR) is well known additive type in the field and can i.a. prevent premature crosslinking. As also known the SRs may also contribute to the unsaturation level of the polymer composition. As examples of scorch retarders, allyl compounds, such as dimers of aromatic alpha-methyl alkenyl monomers, preferably 2,4-di-phenyl-4-methyl-1-pentene, substituted or unsubstituted diphenylethylenes, quinone derivatives, hydroquinone derivatives, monofunctional vinyl containing esters and ethers, monocyclic hydrocarbons having at least two or more double bonds, or mixtures thereof, can be mentioned. Preferably, the amount of a scorch retarder is within the range of 0.005 to 2.0 wt.-%, more preferably within the range of 0.005 to 1.5 wt.-%, based on the weight of the Polymer Composition. Further preferred ranges are e.g. from 0.01 to 0.8 wt %, 0.03 to 0.75 wt %, 0.03 to 0.70 wt %, or 0.04 to 0.60 wt %, based on the weight of the Polymer Composition. Preferred SR of the Polymer composition is 2,4-Diphenyl-4-methyl-1-pentene (CAS number 6362-80-7).

The preferred Cable is preferably an AC or DC power cable, preferably a DC power cable, more preferably a medium voltage (MV), a high voltage (HV) or an extra high voltage (EHV) DC power cable, more preferably a HV or EHV DC power cable. It is evident that the following further preferable embodiments, subgroups and further properties of the polymer compositions, and components thereof, and of the layers of the Cable are generalisable and independent definitions which can be used in any combination for further defining the Cable.

Polyolefin of the Polymer Composition of the Insulation Layer

The term polyolefin means both an olefin homopolymer and a copolymer of an olefin with one or more comonomer(s). As well known "comonomer" refers to copolymerisable comonomer units.

The polyolefin can be any polyolefin, such as a conventional polyolefin, which is suitable as a polymer in at least an insulating layer of an electrical cable, preferably of a power cable.

The polyolefin can be e.g. a commercially available polymer or can be prepared according to or analogously to known polymerization process described in the chemical literature.

More preferably the polyolefin is a polyethylene produced in a high pressure process, more preferably a low density polyethylene LDPE produced in a high pressure process. The meaning of LDPE polymer is well known and documented in the literature. Although the term LDPE is an abbreviation for low density polyethylene, the term is understood not to limit the density range, but covers the LDPE-like HP polyethylenes with low, medium and higher densities. The term LDPE describes and distinguishes only the nature of HP polyethylene with typical features, such as different branching architecture, compared to the PE produced in the presence of an olefin polymerisation catalyst.

The LDPE as said polyolefin mean a low density homopolymer of ethylene (referred herein as LDPE homopolymer) or a low density copolymer of ethylene with one or more comonomer(s) (referred herein as LDPE copolymer). The one or more comonomers of LDPE copolymer are preferably selected from the polar comonomer(s), non-polar comonomer(s) or from a mixture of the polar comonomer(s) and non-polar comonomer(s), as defined above or below. Moreover, said LDPE homopolymer or LDPE copolymer as said polyolefin may optionally be unsaturated.

As a polar comonomer for the LDPE copolymer as said polyolefin, comonomer(s) containing hydroxyl group(s), alkoxy group(s), carbonyl group(s), carboxyl group(s), ether group(s) or ester group(s), or a mixture thereof, can be used. More preferably, comonomer(s) containing carboxyl and/or ester group(s) are used as said polar comonomer. Still more preferably, the polar comonomer(s) of LDPE copolymer is selected from the groups of acrylate(s), methacrylate(s) or acetate(s), or any mixtures thereof. If present in said LDPE copolymer, the polar comonomer(s) is preferably selected from the group of alkyl acrylates, alkyl methacrylates or vinyl acetate, or a mixture thereof. Further preferably, said polar comonomers are selected from $C_1$- to $C_6$-alkyl acrylates, $C_1$- to $C_6$-alkyl methacrylates or vinyl acetate. Still more preferably, said polar LDPE copolymer is a copolymer of ethylene with $C_1$- to $C_4$-alkyl acrylate, such as methyl, ethyl, propyl or butyl acrylate, or vinyl acetate, or any mixture thereof.

As the non-polar comonomer(s) for the LDPE copolymer as said polyolefin, comonomer(s) other than the above defined polar comonomers can be used. Preferably, the non-polar comonomers are other than comonomer(s) containing hydroxyl group(s), alkoxy group(s), carbonyl group(s), carboxyl group(s), ether group(s) or ester group(s). One group of preferable non-polar comonomer(s) comprise, preferably consist of, monounsaturated (=one double bond) comonomer(s), preferably olefins, preferably alpha-olefin(s), more preferably $C_3$ to $C_{10}$ alpha-olefin(s), such as propylene, 1-butene, 1-hexene, 4-methyl-1-pentene, styrene, 1-octene, 1-nonene; polyunsaturated (=more than one double bond) comonomer(s); a silane group containing comonomer(s); or any mixtures thereof. The polyunsaturated comonomer(s) are further described below in relation to unsaturated LDPE copolymers.

If the LDPE polymer is a copolymer, it preferably comprises 0.001 to 50 wt.-%, more preferably 0.05 to 40 wt.-%, still more preferably less than 35 wt.-%, still more preferably less than 30 wt.-%, more preferably less than 25 wt.-%, of one or more comonomer(s).

The Polymer composition, preferably the polyolefin component thereof, more preferably the LDPE polymer, may optionally be unsaturated, i.e. the polymer composition, preferably the polyolefin, preferably the LDPE polymer, may comprise carbon-carbon double bonds. The "unsaturated" means herein that the polymer composition, preferably the polyolefin, contains carbon-carbon double bonds/1000 carbon atoms in a total amount of at least 0.4/1000 carbon atoms.

As well known the unsaturation can be provided to the Polymer composition i.a. by means of the polyolefin, a low molecular weight (Mw) compound(s), such as crosslinking booster(s) or scorch retarder additive(s), or any combinations thereof. The total amount of double bonds means herein double bonds determined from the source(s) that are known and deliberately added to contribute to the unsaturation. If two or more above sources of double bonds are chosen to be used for providing the unsaturation, then the total amount of double bonds in the Polymer composition means the sum of the double bonds present in the double-bond sources. It is evident that a characteristic model compound for calibration is used for each chosen source to enable the quantitative infrared (FTIR) determination.

Any double bond measurements are carried out prior to crosslinking

If the Polymer composition is unsaturated prior to crosslinking, then it is preferred that the unsaturation originates at least from an unsaturated polyolefin component. More preferably, the unsaturated polyolefin is an unsaturated polyethylene, more preferably an unsaturated LDPE polymer, even more preferably an unsaturated LDPE homopolymer or an unsaturated LDPE copolymer. When polyunsaturated comonomer(s) are present in the LDPE polymer as said unsaturated polyolefin, then the LDPE polymer is an unsaturated LDPE copolymer.

In a preferred embodiment the term "total amount of carbon-carbon double bonds" is defined from the unsaturated polyolefin, and refers, if not otherwise specified, to the combined amount of double bonds which originate from vinyl groups, vinylidene groups and trans-vinylene groups, if present. Naturally the polyolefin does not necessarily contain all the above three types of double bonds. However, any of the three types, when present, is calculated to the "total amount of carbon-carbon double bonds". The amount of each type of double bond is measured as indicated under "Determination methods".

If an LDPE homopolymer is unsaturated, then the unsaturation can be provided e.g. by a chain transfer agent (CTA), such as propylene, and/or by polymerization conditions. If an LDPE copolymer is unsaturated, then the unsaturation can be provided by one or more of the following means: by a chain transfer agent (CTA), by one or more polyunsaturated comonomer(s) or by polymerisation conditions. It is well known that selected polymerisation conditions such as peak temperatures and pressure, can have an influence on the unsaturation level. In case of an unsaturated LDPE copolymer, it is preferably an unsaturated LDPE copolymer of ethylene with at least one polyunsaturated comonomer, and optionally with other comonomer(s), such as polar comonomer(s) which is preferably selected from acrylate or acetate comonomer(s). More preferably an unsaturated LDPE copolymer is an unsaturated LDPE copolymer of ethylene with at least polyunsaturated comonomer(s).

The polyunsaturated comonomers suitable for the unsaturated polyolefin preferably consist of a straight carbon chain with at least 8 carbon atoms and at least 4 carbons between the non-conjugated double bonds, of which at least one is terminal, more preferably, said polyunsaturated comonomer is a diene, preferably a diene which comprises at least eight carbon atoms, the first carbon-carbon double bond being terminal and the second carbon-carbon double bond being non-conjugated to the first one. Preferred dienes are selected from $C_8$ to $C_{14}$ non-conjugated dienes or mixtures thereof, more preferably selected from 1,7-octadiene, 1,9-decadiene, 1,11-dodecadiene, 1,13-tetradecadiene, 7-methyl-1,6-octadiene, 9-methyl-1,8-decadiene, or mixtures thereof. Even more preferably, the diene is selected from 1,7-octadiene, 1,9-decadiene, 1,11-dodecadiene, 1,13-tetradecadiene, or any mixture thereof, however, without limiting to above dienes.

It is well known that e.g. propylene can be used as a comonomer or as a chain transfer agent (CTA), or both, whereby it can contribute to the total amount of the C—C double bonds, preferably to the total amount of the vinyl groups. Herein, when a compound which can also act as comonomer, such as propylene, is used as CTA for providing double bonds, then said copolymerisable comonomer is not calculated to the comonomer content.

If the polyolefin, more preferably the LDPE polymer, is unsaturated, then it has preferably a total amount of carbon-carbon double bonds, which originate from vinyl groups, vinylidene groups and trans-vinylene groups, if present, of more than 0.5/1000 carbon atoms. The upper limit of the amount of carbon-carbon double bonds present in the polyolefin is not limited and may preferably be less than 5.0/1000 carbon atoms, preferably less than 3.0/1000 carbon atoms.

In some embodiments, wherein e.g. higher crosslinking level of the final crosslinked insulation layer is desired, the total amount of carbon-carbon double bonds, which originate from vinyl groups, vinylidene groups and trans-vinylene groups, if present, in the unsaturated LDPE, is preferably higher than 0.50/1000 carbon atoms, preferably higher than 0.60/1000 carbon atoms.

If desired, the higher double bond content combined with the preferable presence of a crosslinking agent, preferably peroxide, provides to the Cable an advantageous balance between electrical, and mechanical properties, preferably combined with good heat and deformation resistance.

Accordingly, the polyolefin is preferably unsaturated and contains at least vinyl groups and the total amount of vinyl groups is preferably higher than 0.05/1000 carbon atoms, still more preferably higher than 0.08/1000 carbon atoms, and most preferably of higher than 0.11/1000 carbon atoms. Preferably, the total amount of vinyl groups is of lower than 4.0/1000 carbon atoms. More preferably, the polyolefin, prior to crosslinking, contains vinyl groups in total amount of more than 0.20/1000 carbon atoms, still more preferably of more than 0.30/1000 carbon atoms, and most preferably of more than 0.40/1000 carbon atoms. In some demanding embodiments, preferably in power cables, more preferably in DC power cables, at least one layer, preferably the insulation layer, comprises LDPE polymer, preferably LDPE copolymer, which contains vinyl groups in total amount of more than 0.50/1000 carbon atoms.

The preferred polyolefin for use in the Polymer composition is a saturated LDPE homopolymer or a saturated LDPE copolymer of ethylene with one or more comonomer(s); or an unsaturated LDPE polymer, which is selected from an unsaturated LDPE homopolymer or an unsaturated LDPE copolymer of ethylene with one or more comonomer(s), even more preferably an unsaturated LDPE homopolymer or an unsaturated LDPE copolymer of ethylene with one or more comonomer(s), which is preferably at least one polyunsaturated comonomer, preferably a diene as defined above, and optionally with other comonomer(s), and has the total amount of carbon-carbon double bonds, which originate from vinyl groups, vinylidene groups and trans-vinylene groups, if present, as defined above, preferably has the total amount of vinyl groups as defined above. Said unsaturated LDPE polymer is highly usable for an insulation layer of a power cable, preferably of a DC power cable, of the invention.

Typically, and preferably in W&C applications, the density of the polyolefin, preferably of the LDPE polymer, is higher than 860 kg/m³. Preferably the density of the polyolefin, preferably of the LDPE polymer, the ethylene homo- or copolymer is not higher than 960 kg/m³, and preferably is from 900 to 945 kg/m³. The $MFR_2$ (2.16 kg, 190° C.) of the polyolefin, preferably of the LDPE polymer, is preferably from 0.01 to 50 g/10 min, more preferably is from 0.1 to 20 g/10 min, and most preferably is from 0.2 to 10 g/10 min.

Compressor Lubricant

The compressor lubricant used in the polymerization process for producing the preferred polyolefin of the Polymer composition comprises mineral oil which is a known petroleum product.

Mineral oils have a well known meaning and are used i.a. for lubrication in commercial lubricants. "Compressor lubricant comprising a mineral oil" and "mineral oil-based compressor lubricants" are used herein interchangeably.

Mineral oil can be a synthetic mineral oil which is produced synthetically or a mineral oil obtainable from crude oil refinery processes.

Typically, mineral oil, known also as liquid petroleum, is a by-product in the distillation of petroleum to produce gasoline and other petroleum based products from crude oil. The mineral oil of the compressor lubricant of the invention is preferably a paraffinic oil. Such paraffinic oil is derived from petroleum based hydrocarbon feedstocks.

Mineral oil is preferably the base oil of the compressor lubricant. The compressor lubricant may comprise other components, such as lubricity additive(s), viscosity builders, antioxidants, other additive(s) or any mixtures thereof, as well known in the art.

More preferably, the compressor lubricant comprises a mineral oil which is conventionally used as compressor lubricants for producing plastics, e.g. LDPE, for food or medical industry, more preferably the compressor lubricant comprises a mineral oil which is a white oil. Even more preferably the compressor lubricant comprises white oil as the mineral oil and is suitable for the production of polymers for food or medical industry. White oil has a well known meaning. Moreover such white oil based compressor lubricants are well known and commercially available. Even more preferably the white oil meets the requirements for a food or medical white oil.

As, known, the mineral oil, preferably the white mineral oil of the preferred compressor lubricant contains paraffinic hydrocarbons.

Even more preferably, of the compressor lubricant meets one or more of the below embodiments:
  In one preferable embodiment, the mineral oil, preferably the white mineral oil, of the compressor lubricant has a viscosity of at least $8.5 \times 10^{-6}$ m$^2$/s at 100° C.;
  In a second preferable embodiment, the mineral oil, preferably the white mineral oil, of the compressor lubricant contains 5% per weight (wt %) or less of hydrocarbons with less than 25 carbon atoms;
  In a third preferable embodiment, the hydrocarbons of the mineral oil, preferably of the white mineral oil, of the compressor lubricant have an average molecular weight (Mw) of 480 or more.

The above "amount of hydrocarbons", "viscosity" and "Mw" are preferably in accordance with the above European Directive 2002/72/EC of 6 Aug. 2002.

It is preferred that the compressor lubricant is according to each of the above three embodiments 1-3.

The most preferred compressor lubricant of the invention meets the requirements given for white mineral oil in European Directive 2002/72/EC of 6 Aug. 2002, Annex V, for plastics used in food contact. Directive is published e.g. in L 220/18 EN Official Journal of the European Communities 15.8.2002. Accordingly the mineral oil is most preferably a white mineral oil which meets said European Directive 2002/72/EC of 6 Aug. 2002, Annex V. Moreover it is preferred that the compressor lubricant complies with said European Directive 2002/72/EC of 6 Aug. 2002.

The compressor lubricant of the invention can be a commercially available compressor lubricant or can be produced by conventional means, and is preferably a commercial lubricant used in high pressure polymerisation processes for producing plastics for medical or food applications. Non-exhaustive examples of preferable commercially available compressor lubricants are e.g. Exxcolub R Series compressor lubricant for production of polyethylene used in food contact and supplied i.a. by ExxonMobil, Shell Corena for producing polyethylene for pharmaceutical use and supplied by Shell, or CL-1000-SONO-EU, supplied by Sonneborn.

The compressor lubricant contains preferably no polyalkyleneglycol based components.

It is preferred that any mineral oil present in the Polymer composition of the invention originates from the compressor lubricant used in the process equipment during the polymerisation process of the polyolefin. Accordingly, it is preferred that no mineral oil is added to the Polymer composition or to the polyolefin after the polymerisation thereof.

Traces of the mineral oil originating from the compressor lubricant and present, if any, in the produced polyolefin would typically amount in maximum of up to 0.4 wt % based on the amount of the polyolefin. The given limit is the absolute maximum based on the calculation of the worst scenario where all the lost compressor lubricant (average leakage) would go to the final polyolefin. Such worst scenario is unlikely and normally the resulting polyolefin contains clearly lower level of the mineral oil.

The compressor lubricant of the invention is used in a conventional manner and well known to a skilled person for the lubrication of the compressor(s) in the compressing step (a) of the invention.

Process

The high pressure (HP) process is the preferred process for producing a polyolefin of the Polymer composition, preferably a low density polyethylene (LDPE) polymer selected from LDPE homopolymer or LDPE copolymer of ethylene with one or more comonomers.

The invention further provides a process for polymerising a polyolefin in a high pressure process which comprises the steps of:
(a) compressing one or more monomer(s) under pressure in a compressor, wherein a compressor lubricant is used for lubrication,
(b) polymerising a monomer optionally together with one or more comonomer(s) in a polymerisation zone(s),
(c) separating the obtained polyolefin from the unreacted products and recovering the separated polyolefin in a recovery zone,
wherein in step a) a compressor lubricant comprises a mineral oil including the preferable embodiments thereof.

Accordingly, the polyolefin of the invention is preferably produced at high pressure by free radical initiated polymerisation (referred to as high pressure radical polymerization). The preferred polyolefin is LDPE homopolymer or LDPE copolymer of ethylene with one or more comonomer(s), as defined above. The LDPE polymer obtainable by the process of the invention preferably provides the advantageous electrical properties as defined above or below. The high pressure (HP) polymerisation and the adjustment of process conditions for further tailoring the other properties of the polyolefin depending on the desired end application are well known and described in the literature, and can readily be used by a skilled person.

Compression Step a) of the Process of the Invention:

Monomer, preferably ethylene, with one or more optional comonomer(s), is fed to one or more compressor at compressor zone to compress the monomer(s) up to the desired polymerization pressure and to enable handling of high amounts of monomer(s) at controlled temperature. Typical compressors, i.e. hyper-compressors, for the process can be piston compressors or diaphragm compressors. The compressor zone usually comprises several compressors that can work in series or in parallel. The compressor lubricant of the invention is used for cylinder lubrication in at least one, preferably in all of the hyper-compressor(s), present in the compressor zone. The compression step a) comprises usually 2-7 compression steps, often with intermediate cooling zones. Temperature is typically low, usually in the range of less than 200° C., preferably of less than 100° C. Any recycled monomer, preferably ethylene, and optional comonomer(s) can be added at feasible points depending on the pressure.

Polymerisation Step b) of the Process:

Preferred high pressure polymerisation is effected at a polymerisation zone which comprises one or more polymerisation reactor(s), preferably at least a tubular reactor or an autoclave reactor, preferably a tubular reactor. The polymerization reactor(s), preferably a tubular reactor, may comprise one or more reactor zones, wherein different polymerization conditions may occur and/or adjusted as well known in the HP field. One or more reactor zone(s) are provided in a known manner with means for feeding monomer and optional comonomer(s), as well as with means for adding initiator(s) and/or further components, such as CTA(s). Additionally, the polymerization zone may comprise a preheating section which is preceding or integrated to the polymerization reactor. In one preferable HP process the monomer, preferably ethylene, optionally together with one or more comonomer(s)

is polymerized in a preferable tubular reactor, preferably in the presence of chain transfer agent(s).

Tubular Reactor:

The reaction mixture is fed to the tubular reactor. The tubular reactor may be operated as a single-feed system (also known as front feed), wherein the total monomer flow from the compressor zone is fed to the inlet of the first reaction zone of the reactor. Alternatively the tubular reactor may be a multifeed system, wherein e.g the monomer(s), the optional comonomer(s) or further component(s) (like CTA(s)) coming from the compression zone, separately or in any combinations, is/are split to two or more streams and the split feed(s) is introduced to the tubular reactor to the different reaction zones along the reactor. For instance 10-90% of the total monomer quantity is fed to the first reaction zone and the other 90-10% of the remaining monomer quantity is optionally further split and each split is injected at different locations along the reactor. Also the feed of initiator(s) may be split in two or more streams. Moreover, in a multifeed system the split streams of monomer(/comonomer) and/or optional further component(s), such as CTA, and, respectively, the split streams of initiator(s) may have the same or different component(s) or concentrations of the components, or both.

The single feed system for the monomer and optional comonomer(s) is preferred in the tubular reactor for producing the polyolefin of the invention.

First part of the tubular reactor is to adjust the temperature of the feed of monomer, preferably ethylene, and the optional comonomer(s); usual temperature is below 200° C., such as 100-200° C. Then the radical initiator is added. As the radical initiator, any compound or a mixture thereof that decomposes to radicals at an elevated temperature can be used. Usable radical initiators, such as peroxides, are commercially available. The polymerization reaction is exothermic. There can be several radical initiator injections points, e.g. 1-5 points, along the reactor usually provided with separate injection pumps. As already mentioned also the monomer, preferably ethylene, and optional comonomer(s), is added at front and optionally the monomer feed(s) can be split for the addition of the monomer and/or optional comonomer(s), at any time of the process, at any zone of the tubular reactor and from one or more injection point(s), e.g. 1-5 point(s), with or without separate compressors.

Furthermore, one or more CTA(s) are preferably used in the polymerization process of the polyolefin. Preferred CTA(s) can be selected from one or more non-polar and one or more polar CTA(s), or any mixtures thereof.

Non-polar CTA, if present, is preferably selected from
i) one or more compound(s) which does not contain a polar group selected from nitrile (CN), sulfide, hydroxyl, alkoxy, aldehyl (HC=O), carbonyl, carboxyl, ether or ester group(s), or mixtures thereof. Non-polar CTA is preferably selected from one or more non-aromatic, straight chain branched or cyclic hydrocarbyl(s), optionally containing a hetero atom such as O, N, S, Si or P. More preferably the non-polar CTA(s) is selected from one or more cyclic alpha-olefin(s) of 5 to 12 carbon or one or more straight or branched chain alpha-olefin(s) of 3 to 12 carbon atoms, more preferably from one or more straight or branched chain alpha-olefin(s) of 3 to 6 carbon atoms. The preferred non-polar CTA is propylene.

The polar CTA, if present, is preferably selected from
i) one or more compound(s) comprising one or more polar group(s) selected from nitrile (CN), sulfide, hydroxyl, alkoxy, aldehyl (HC=O), carbonyl, carboxyl, ether or ester group(s), or mixtures thereof;
ii) one or more aromatic organic compound(s), or
iii) any mixture thereof.

Preferably any such polar CTA(s) have up to 12 carbon atoms, e.g. up to 10 carbon atoms preferably up to 8 carbon atoms. A preferred option includes a straight chain or branched chain alkane(s) having up to 12 carbon atoms (e.g. up to 8 carbon atoms) and having at least one nitrile (CN), sulfide, hydroxyl, alkoxy, aldehyl (HC=O), carbonyl, carboxyl or ester group.

More preferably the polar CTA(s), if present, is selected from i) one or more compound(s) containing one or more hydroxyl, alkoxy, HC=O, carbonyl, carboxyl and ester group(s), or a mixture thereof, more preferably from one or more alcohol, aldehyde and/or ketone compound(s). The preferred polar CTA(s), if present, is a straight chain or branched chain alcohol(s), aldehyde(s) or ketone(s) having up to 12 carbon atoms, preferably up to 8 carbon atoms, especially up to 6 carbon atoms, most preferably, isopropanol (IPA), methylethylketone (MEK) and/or propionaldehyde (PA).

The amount of the preferable CTA(s) is not limited and can be tailored by a skilled person within the limits of the invention depending on the desired end properties of the final polymer. Accordingly, the preferable chain transfer agent(s) can be added in any injection point of the reactor to the polymer mixture. The addition of one or more CTA(s) can be effected from one or more injection point(s) at any time during the polymerization.

In case the polymerization of the polyolefin is carried out in the presence of a CTA mixture comprising one or more polar CTA(s) as defined above and one or more non-polar CTA(s) as defined above, then the feed ratio by weight % of polar CTA to non-polar CTA is preferably
1 to 99 wt % of polar CTA and
1 to 99 wt % of non-polar CTA, based on the combined amount of the feed of polar CTA and the non-polar CTA into the reactor.

The addition of monomer, comonomer(s) and optional CTA(s) may include and typically includes fresh and recycled feed(s).

The reactor is continuously cooled e.g. by water or steam. The highest temperature is called peak temperature and the reaction starting temperature is called initiation temperature.

Suitable temperatures range up to 400° C., preferably from 80 to 350° C. and pressure from 700 bar, preferably 1000 to 4000 bar, more preferably from 1000 to 3500 bar. Pressure can be measured at least after compression stage and/or after the tubular reactor. Temperature can be measured at several points during all steps. High temperature and high pressure generally increase output. Using various temperature profiles selected by a person skilled in the art will allow control of structure of polymer chain, i.e. Long Chain Branching and/or Short Chain branching, density, branching factor, distribution of comonomers, MFR, viscosity, Molecular Weight Distribution etc.

The reactor ends conventionally with a valve a so-called production control valve. The valve regulates reactor pressure and depressurizes the reaction mixture from reaction pressure to separation pressure.

Recovering Step c) of the Process:
Separation:

The pressure is typically reduced to approx 100 to 450 bar and the reaction mixture is fed to a separator vessel where most of the unreacted, often gaseous, products are removed from the polymer stream. Unreacted products comprise e.g. monomer or the optional comonomer(s), and most of the unreacted components are recovered. The polymer stream is optionally further separated at lower pressure, typically less than 1 bar, in a second separator vessel where more of the unreacted products are recovered. Normally low molecular compounds, i.e. wax, are removed from the gas. The gas is usually cooled and cleaned before recycling.

Recovery of the Separated Polymer:

After the separation the obtained polymer is typically in a form of a polymer melt which is normally mixed and pelletized in a pelletising section, such as pelletising extruder, arranged in connection to the HP reactor system. Optionally, additive(s), such as antioxidant(s), can be added in this mixer in a known manner to result in the Polymer composition.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

As to polymer properties, e.g. MFR, of the polymerised Polymer, preferably LDPE polymer, the properties can be adjusted by using e.g. chain transfer agent during the polymerisation, or by adjusting reaction temperature or pressure (which also to a certain extent have an influence on the unsaturation level).

When an unsaturated LDPE copolymer of ethylene is prepared, then, as well known, the C—C double bond content can be adjusted by polymerising the ethylene e.g. in the presence of one or more polyunsaturated comonomer(s), chain transfer agent(s), process conditions, or any combinations thereof, e.g. using the desired feed ratio between monomer, preferably ethylene, and polyunsaturated comonomer and/or chain transfer agent, depending on the nature and amount of C—C double bonds desired for the unsaturated LDPE copolymer. I.a. WO 9308222 describes a high pressure radical polymerisation of ethylene with polyunsaturated monomers, such as an $\alpha,\omega$-alkadienes, to increase the unsaturation of an ethylene copolymer. The non-reacted double bond(s) thus provides i.a. pendant vinyl groups to the formed polymer chain at the site, where the polyunsaturated comonomer was incorporated by polymerization. As a result the unsaturation can be uniformly distributed along the polymer chain in random copolymerisation manner. Also e.g. WO 9635732 describes high pressure radical polymerisation of ethylene and a certain type of polyunsaturated $\alpha,\omega$-divinylsiloxanes. Moreover, as known, e.g. propylene can be used as a chain transfer agent to provide said double bonds.

Polymer Composition of the Insulation Layer

The Polymer composition of the invention comprises typically at least 50 wt %, preferably at least 60 wt %, more preferably at least 70 wt %, more preferably at least 75 wt %, more preferably from 80 to 100 wt % and more preferably from 85 to 100 wt %, of the polyolefin based on the total weight of the polymer component(s) present in the Polymer composition. The preferred Polymer composition consists of polyolefin as the only polymer component. The expression means that the Polymer composition does not contain further polymer components, but the polyolefin as the sole polymer component. However, it is to be understood herein that the Polymer composition may comprise further component(s) other than polymer components, such as additive(s) which may optionally be added in a mixture with a carrier polymer, i.e. in so called master batch.

The Polymer composition of the insulation layer with advantageous reduced electric conductivity may comprise further component(s), preferably conventionally used additive(s) for W&C applications, such as crosslinking agent(s), preferably in the presence of at least one peroxide and/or antioxidant(s). The used amounts of additives are conventional and well known to a skilled person, e.g. as already described above under "Description of the invention".

The polymer composition preferably comprises peroxide(s) and the optional antioxidant(s) and optionally scorch retarder(s). Preferable examples of peroxide(s), optional antioxidant(s) and optional scorch retarder(s) are listed above under "Description of the invention".

The Polymer composition preferably consist of the polyolefin, which is preferably polyethylene, more preferably LDPE homo or copolymer which may optionally be unsaturated, of the invention as the sole polymer component. The most preferred polyolefin of the Polymer composition is an unsaturated LDPE homo or copolymer.

Semiconductive Composition of the Semiconductive Layer

Accordingly, the Semiconductive composition used for producing the semiconductive layer comprises carbon black and preferably a polyolefin (2).

The polyolefin (2) can be any polyolefin suitable for a semiconductive layer. Preferably, the polyolefin (2) is an olefin homopolymer or copolymer which contains one or more comonomer(s), more preferably a polyethylene, which can be made in a low pressure process or a high pressure process.

When the polyolefin (2), preferably polyethylene, is produced in a low pressure process, then it is typically produced by a coordination catalyst, preferably selected from a Ziegler Natta catalyst, a single site catalyst, which comprises a metallocene and non-metallocene catalyst, and a Cr catalyst, or any mixture thereof. The polyethylene produced in a low pressure can have any density, e.g be a very low density linear polyethylene (VLDPE), a linear low density polyethylene (LLDPE) copolymer of ethylene with one or more comonomer(s), medium density polyethylene (MDPE) or high density polyethylene (HDPE). Low pressure polyethylene can be unimodal or multimodal with respect to one or more of molecular weight distribution, comonomer distribution or density distribution. When the low pressure PE is multimodal with respect to molecular weight distribution, then is has at least two polymer components which are different, preferably a lower weight average molecular weight (LMW) and a higher weight average molecular weight (HMW). A unimodal low pressure PE is typically prepared using a single stage polymerisation, e.g. solution, slurry or gas phase polymerisation, in a manner well known in the art. A multimodal (e.g. bimodal) low pressure PE can be produced by blending mechanically two or more, separately prepared polymer components or by in-situ blending in a multistage polymerisation process during the preparation process of the polymer components. Both mechanical and in-situ blending is well known in the field. When the polyolefin (2), preferably polyethylene, is produced in a high pressure process, then the preferred polyolefin is an LDPE homo polymer or an LDPE copolymer of ethylene with one or more comonomers. In some embodiments the LDPE homopolymer and copolymer may be unsaturated. Examples of suitable LDPE polymers and general principles for their polymerization are described above in relation to polyolefin of the Polymer composition of the insulation layer, however, without limiting to any specific lubricant in the compressor(s) during the compressing step (a) of the process. For the production of ethylene (co)polymers by high pressure radical polymerization, reference can be made to the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

The semiconductive properties result from the carbon black added to the polyolefin (2). Thus, the amount of carbon black is at least such that a semiconducting composition is obtained. Depending on the desired use, the conductivity of the carbon black and conductivity of the composition, the amount of carbon black can vary.

Preferably, the polymer composition comprises 10 to 50 wt. % carbon black, based on the weight of the Semiconductive composition.

In other embodiments, the lower limit of the amount of carbon black is 10 wt.-%, preferably 20 wt.-%, more preferably 25 wt.-%, based on the weight of the Semiconductive composition. The upper limit of the amount of carbon black is preferably 50 wt.-%, preferably 45 wt.-%, more preferably 41 wt %, based on the weight of the Semiconductive composition.

Any carbon black which is electrically conductive can be used. Preferably, the carbon black may have a nitrogen surface area (BET) of 5 to 400 $m^2/g$, preferably of 10 to 300 $m^2/g$, more preferably of 30 to 200 $m^2/g$, when determined according to ASTM D3037-93. Further preferably the carbon black has one or more of the following properties: i) a primary particle size of at least 5 nm which is defined as the number average particle diameter according to ASTM D3849-95a procedure D, ii) iodine absorption number (IAN) of at least 10 mg/g, preferably of 10 to 300 mg/g, more preferably of 30 to 200 mg/g, when determined according to ASTM D-1510-07; and/or iii) DBP (dibutyl phthalate) absorption number (=oil number) of at least 30 $cm^3/100$ g, preferably of 60 to 300 $cm^3/100$ g, preferably of 70 to 250 $cm^3/100$ g, more preferably of 80 to 200, preferably of 90 to 180 $cm^3/100$ g, when measured according to ASTM D 2414-06a.

More preferably the carbon black has one or more of the following properties: a) a primary particle size of at least 5 nm which is defined as the number average particle diameter according ASTM D3849-95a, b) iodine number of at least 30 mg/g according to ASTM D1510, c) oil absorption number of at least 30 ml/100 g which is measured according to ASTM D2414. Non-limiting examples of preferable carbon blacks include furnace blacks and acetylene blacks.

One group of preferable furnace blacks have a primary particle size of 28 nm or less. The mean primary particle size is defined as the number average particle diameter measured according to ASTM D3849-95a. Particularly suitable furnace blacks of this category preferably have an iodine number between 60 and 300 mg/g according to ASTM D1510. It is further preferred that the oil absorption number (of this category) is between 50 and 225 ml/100 g, preferably between 50 and 200 ml/100 g and this is measured according to ASTM D2414.

Another group of equally preferable furnace blacks have a primary particle size of greater than 28 nm. The mean primary particle size is defined as the number average particle diameter according to ASTM D3849-95a. Particularly suitable furnace blacks of this category preferably have an iodine number between 30 and 200 mg/g according to ASTM D1510. It is further preferred that the oil absorption number (of this category) is between 80 and 300 ml/100 g measured according to ASTM D2414.

Other suitable carbon blacks can be made by any other process or can be further treated. Suitable carbon blacks for semiconductive cable layers are preferably characterized by their cleanliness. Therefore, preferred carbon blacks have an ash-content of less than 0.2 wt-% measured according to ASTM D1506, a 325 mesh sieve residue of less than 30 ppm according to ASTM D1514 and have less than 1 wt-% total sulphur according to ASTM D1619.

Furnace carbon black is generally acknowledged term for the well known carbon black type that is produced in a furnace-type reactor. As examples of carbon blacks, the preparation process thereof and the reactors, reference can be made to i.a. EP629222 of Cabot, U.S. Pat. No. 4,391,789, U.S. Pat. No. 3,922,335 and U.S. Pat. No. 3,401,020. As an example of commercial furnace carbon black grades described in ASTM D 1765-98b i.a. N351, N293 and N550, can be mentioned.

Furnace carbon blacks are conventionally distinguished from acetylene carbon blacks which are another preferable carbon black type preferable for the Semiconductive composition, Acetylene carbon blacks are produced in a acetylene black process by reaction of acetylene and unsaturated hydrocarbons, e.g. as described in U.S. Pat. No. 4,340,577. Particularly preferable acetylene blacks may have a particle size of larger than 20 nm, more preferably 20 to 80 nm. The mean primary particle size is defined as the number average particle diameter according to the ASTM D3849-95a. Particularly suitable acetylene blacks of this category have an iodine number between 30 to 300 mg/g, more preferably 30 to 150 mg/g according to ASTM D1510. It is further preferred that the oil absorption number (of this category) is between 80 to 300 ml/100 g, more preferably 100 to 280 ml/100 g and this is measured according to ASTM D2414. Acetylene black is a generally acknowledged term and are very well known and e.g. supplied by Denka.

The Semiconductive composition may contain further component(s), such as conventional additive(s) in conventional amounts as used in the W&C applications. Typical examples of additives are described above under "Description of the invention".

Preferably, the Semiconductive composition has a volume resistivity according to ISO3915, measured at 90° C., of less than 500,000 Ohm cm, more preferably less than 100,000 Ohm cm, even more preferably less than 50,000 Ohm cm. Volume resistivity is in a reciprocal relationship to electrical conductivity, i.e. the lower the resistivity, the higher is the conductivity.

End Uses and End Applications of the Invention

As mentioned above, the new Polymer composition of the insulation layer of the Cable is highly useful in wide variety of W&C applications, more preferably in one or more layers of a power cable.

A power cable is defined to be a cable transferring energy operating at any voltage, typically operating at voltages higher than 1 kV. The voltage applied to the power cable can be alternating (AC), direct (DC), or transient (impulse). The polymer composition of the invention is very suitable for power cables, especially for power cables operating at voltages higher than 6 kV to 36 kV (medium voltage (MV) cables) and at voltages higher than 36 kV, known as high voltage (HV) cables and extra high voltage (EHV) cables, which EHV cables operate, as well known, at very high voltages. The terms have well known meanings and indicate the operating level of such cables. For HV and EHV DC cables the operating voltage is defined herein as the electric voltage between ground and the conductor of the high voltage cable. HV DC power cable and EHV DC power cable can operate e.g. at voltages of 40 kV or higher, even at voltages of 50 kV or higher. EHV DC power cables operate at very high voltage ranges e.g as high as up to 800 kV, however without limiting thereto.

The Polymer composition with advantageous DC conductivity properties is also highly suitable for direct current (DC) power cables operating at any voltages, preferably at higher than 36 kV, such as HV or EHV DC power cables, as defined above.

In addition to reduced electrical conductivity, the Polymer composition has preferably also very good space charge properties which are advantageous for power cables, particularly for DC power cables.

The invention further provides the use of the polyolefin of the invention, which is obtainable by the high pressure (HP) process of the invention, for producing an insulation layer of a power cable, preferably of a DC power cable.

According to a preferred embodiment, the Cable is a power cable, preferably a DC power cable, comprising at least one semiconductive layer as defined above comprising, preferably consisting of, a Semiconductive composition containing a CB, which is preferably selected from a furnace black or an acetylene black, and an insulation layer comprising, preferably consisting of, the Polymer composition as defined above. More preferably, the Cable, preferably the power cable, more preferably the DC power cable, comprises said at least one semiconductive layer as defined above as an inner semiconductive layer and said insulation layer as defined above, and additionally an outer semiconductive layer, in that order, optionally surrounded by one or more other layer(s), such as screen(s), a jacketing layer(s) or other protective layer(s), as well known in the field. In this embodiment the outer semiconductive layer preferably comprises, preferably consists of, a Semiconductive composition as defined above. The semiconductive composition of the outer semiconductive layer may be identical or different from the Semiconductive composition of the inner semiconductive layer.

Preferably, at least the Polymer composition of the insulation layer is crosslinkable. Further preferably, also at least the Semiconductive composition of the semiconductive layer is crosslinkable.

The invention also provides a process for producing a Cable, preferably a crosslinkable power cable, more preferably a crosslinkable DC power cable, as defined above or in claims, comprising steps of applying on a conductor, preferably by (co)extrusion, at least a semiconductive layer comprising the Semiconductive composition and an insulation layer comprising the Polymer composition, in any order.

The Cable production process of the invention is preferably carried out by
(a) providing a Semiconductive composition of the invention as defined above or below in claims and mixing, preferably meltmixing in an extruder, the Semiconductive composition optionally together with further component(s), such as further polymer component(s) and/or additive(s),
(b) providing a Polymer composition of the invention as defined above or below in claims and mixing, preferably meltmixing in an extruder, the Polymer composition optionally together with further component(s), such as further polymer component(s) and/or additive(s),
(c) applying on a conductor, preferably by (co)extrusion,
    a meltmix of the Semiconductive composition obtained from step (a) to form a semiconductive layer, preferably at least the inner semiconductive layer,
    a meltmix of the Polymer composition obtained from step (b) to form the insulation layer; and
(d) optionally crosslinking at least one layer of the obtained cable.

More preferable embodiment of the invention provides a process for producing the power cable of the invention, preferably a DC power cable, comprising a conductor surrounded by an inner semiconductive layer, an insulation layer, and an outer semiconductive layer, in that order, wherein the process comprises the steps of
(a) providing a Semiconductive composition of the invention as defined above or below in claims and meltmixing the Semiconductive composition preferably in the presence of additive(s) selected at least from one or more crosslinking agent(s) and optionally from one or more antioxidant(s),
(b) providing a Polymer composition and meltmixing the Polymer composition preferably in the presence of additive(s) selected at least from one or more crosslinking agent(s) and preferably from one or more antioxidant(s),
(c) applying on a conductor, preferably by coextrusion,
    a meltmix of Semiconductive composition obtained from step (a) to form at least the inner semiconductive layer and preferably the outer semiconductive layer,
    a meltmix of Polymer composition obtained from step (b) to form the insulation layer, and
(d) optionally crosslinking at least one layer of the obtained cable at crosslinking conditions.

Melt mixing means mixing above the melting point of at least the major polymer component(s) of the obtained mixture and is typically carried out in a temperature of at least 10-15° C. above the melting or softening point of polymer component(s).

The term "(co)extrusion" means herein that in case of two or more layers, said layers can be extruded in separate steps, or at least two or all of said layers can be coextruded in a same extrusion step, as well known in the art. The term "(co) extrusion" means herein also that all or part of the layer(s) are formed simultaneously using one or more extrusion heads. For instance triple extrusion can be used for forming three cable layers.

Preferably, said part or all of the Polymer composition, preferably at least the polyolefin, is in form of powder, grain or pellets, when provided to the cable production process.

Pellets can be of any size and shape and can be produced by any conventional pelletising device, such as a pelletising extruder.

As well known, the Semiconductive composition and/or the Polymer composition can be produced before or during the cable production process. Moreover the Semiconductive composition and the Polymer composition can each independently comprise part or all of the component(s) thereof before introducing to the (melt)mixing step a) and b) of the cable production process.

According to one embodiment, the Polymer composition comprises said optional further component(s). In this embodiment part or all of said further component(s) may e.g. be added
1) by meltmixing to the polyolefin, which may be in a form as obtained from a polymerisation process, and then the obtained meltmix is pelletised, and/or
2) by mixing to the pellets of the polyolefin which pellets may already contain part of said further component(s). In this option 2) part or all of the further component(s) can be meltmixed together with the pellets and then the obtained meltmix is pelletised; and/or part or all of the further components can be impregnated to the solid pellets.

In alternative second embodiment, the Polymer composition may be prepared in connection with the cable production line e.g. by providing the polyolefin, preferably in form of pellets which may optionally comprise part of the further component(s), and combined with all or rest of the further component(s) in the mixing step b) to provide a (melt)mix for the step c) of the process of the invention. In case the pellets of the polyolefin contain part of the further component(s), then the pellets may be prepared as described in the above first embodiment.

The further component(s) is preferably selected at least from one or more additive(s), preferably at least from free radical generating agent(s), more preferably from peroxide(s), optionally, and preferably, from antioxidant(s) and optionally from scorch retardant(s) as mentioned above.

In the preferred embodiment the polymer composition of the invention is provided to the cable production process in a form of premade pellets.

Similarly the Semiconductive composition is preferably provided to the step a) in form of pellets comprising at least the polyolefin (2), preferably also the carbon black, and optionally part or all of the further component(s), if present. Said pellets may be produced as described above in the first alternative embodiment for preparing the Polymer composition. As an equally alternative embodiment the Semiconductive composition may be prepared during the Cable production process at the mixing step a) by providing the polyolefin (2), and any or all of a carbon black and optional further component(s) in the mixing step a) to provide a (melt)mix for the step c) of the process of the invention. In this embodiment the Semiconductive comprises preferably the polyolefin (2), carbon black and said further component(s), whereby the polyolefin (2) is provided to the step a) in from of pellets which additionally contain at least the carbon black and optionally part of the further component(s). Then the rest or all of the further component(s) are added in step a) and (melt) mixed with said pellets. In case the pellets of the polyolefin (2) contain the carbon black and/or further component(s), then the pellets may be prepared as described in the above first embodiment for preparing the Polymer composition. The optional further component(s) of the Semiconductive composition is preferably selected at least from free radical generating agent(s), more preferably from peroxide(s), and optionally, and preferably, from antioxidant(s).

The mixing step (a) and/or (b) of the provided Polymer composition and Semiconductive composition is preferably carried out in the cable extruder. The step a) and/or b) may optionally comprise a separate mixing step, e.g. in a mixer, preceding the cable extruder. Mixing in the preceding separate mixer can be carried out by mixing with or without external heating (heating with an external source) of the component(s). Any further component(s) of the Polymer composition and/or semiconductive composition, if present and added during the Cable production process, can be added at any stage and any point(s) in to the cable extruder, or to the optional separate mixer preceding the cable extruder. The addition of additive(s) can be made simultaneously or separately as such, preferably in liquid form, or in a well known master batch, and at any stage during the mixing step (a) and/or (b).

It is preferred that the (melt)mix of the Polymer composition obtained from (melt)mixing step b) consists of the polyolefin of the invention as the sole polymer component. The optional, and preferable, additive(s) can be added to Polymer composition as such or as a mixture with a carrier polymer, i.e. in a form of so-called master batch.

Most preferably the mixture of the semiconductive composition of the invention obtained from step (a) and the mixture of the polymer composition of the invention obtained from step (b) is a meltmix produced at least in an extruder.

In a preferred embodiment of the Cable production process, a crosslinked Cable as defined above is produced, wherein at least the Polymer composition of the insulation layer is crosslinkable and is crosslinked in the step d) in crosslinking conditions. In a more preferred embodiment, a crosslinked power cable, preferably a crosslinked DC power cable, is produced comprising a conductor surrounded by an inner semiconductive layer comprising, preferably consisting of, the Semiconductive composition, an insulation layer comprising, preferably consisting of, the Polymer composition, and optionally, and preferably, an outer semiconductive layer comprising, preferably consisting of, the Semiconductive composition,
wherein (d) one or more of the polymer composition of the insulation layer, the semiconductive composition of the inner semiconductive layer and the semiconductive composition of the outer semiconductive layer, of the obtained cable, preferably at least the polymer composition of the insulation layer, more preferably the polymer composition of the insulation layer, and at least one, preferably both, of the semiconductive composition of the inner semiconductive layer and the semiconductive composition of the outer semiconductive layer, is crosslinked at crosslinking conditions. Crosslinking step (d) is carried out in the presence of a crosslinking agent(s), preferably free radical generating agent(s), more preferably peroxide(s), and at crosslinking conditions.

The crosslinking conditions in step (d) of the Cable production process means preferably an elevated temperature. Crosslinking can be carried out at increased temperature which is chosen, as well known, depending on the type of crosslinking agent. For instance temperatures above 150° C., such as from 160 to 350° C., are typical, however without limiting thereto.

The invention further provides a crosslinked cable, preferably a crosslinked power cable, more preferably a crosslinked DC power cable, as defined above including the preferred embodiments, produced by the Cable production process comprising the step a), step b) and step c) as defined above.

The thickness of the insulation layer of the power cable, preferably of the DC cable, more preferably of the HV or EHV DC power cable, is typically 2 mm or more, preferably at least 3 mm, preferably of at least 5 to 100 mm, when measured from a cross section of the insulation layer of the cable.

The invention further provides a use of the cable of the invention for reducing the DC conductivity in DC power cable end applications, preferably in HV or EHV DC power cable end applications.

Determination Methods

Unless otherwise stated in the description or experimental part the following methods were used for the property determinations.

Wt %: % by weight

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylenes and may be determined at different loadings such as 2.16 kg ($MFR_2$) or 21.6 kg ($MFR_{21}$).

Density

The density was measured according to ISO 1183-2. The sample preparation was executed according to ISO 1872-2 Table 3 Q (compression moulding).

Molecular Weight

The Mz, Mw, Mn, and MWD are measured by Gel Permeation Chromatography (GPC) for low molecular weight polymers as known in the field.

Comonomer Contents a) Quantification of alpha-olefin content in linear low density polyethylenes and low density polyethylenes by NMR spectroscopy:

The comonomer content was determined by quantitative 13C nuclear magnetic resonance (NMR) spectroscopy after basic assignment (J. Randall JMS—Rev. Macromol. Chem.

Phys., C29(2&3), 201-317 (1989)). Experimental parameters were adjusted to ensure measurement of quantitative spectra for this specific task.

Specifically solution-state NMR spectroscopy was employed using a Bruker AvanceIII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140° C. Proton decoupled 13C single pulse NMR spectra with NOE (powergated) were recorded using the following acquisition parameters: a flip-angle of 90 degrees, 4 dummy scans, 4096 transients an acquisition time of 1.6 s, a spectral width of 20 kHz, a temperature of 125° C., a bilevel WALTZ proton decoupling scheme and a relaxation delay of 3.0 s. The resulting FID was processed using the following processing parameters: zero-filling to 32 k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

b) Comonomer Content of Polar Comonomers in Low Density Polyethylene (1) Polymers Containing >6 Wt. % Polar Comonomer Units Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt %. Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 $cm^{-1}$ was divided with the peak height of polyethylene at 2020 $cm^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 $cm^{-1}$ was subtracted with the absorbance value for the base line at 2475 $cm^{-1}$ ($A_{methylacrylate}-A_{2475}$). Then the maximum absorbance peak for the polyethylene peak at 2660 $cm^-$ was subtracted with the absorbance value for the base line at 2475 $cm^{-1}$ ($A_{2660}-A_{2475}$). The ratio between ($A_{methylacrylate}-A_{2475}$) and ($A_{2660}-A_{2475}$) was then calculated in the conventional manner which is well documented in the literature.

The weight-% can be converted to mol-% by calculation. It is well documented in the literature.

Quantification of Copolymer Content in Polymers by NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers Containing 6 wt. % or Less Polar Comonomer Units

Comonomer content (wt. %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described above under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 $cm^{-1}$ and butylacrylate at 1165 $cm^{-1}$) was subtracted with the absorbance value for the base line at 1850 $cm^{-1}$ ($A_{polar\ comonomer}-A_{1850}$). Then the maximum absorbance peak for polyethylene peak at 2660 $cm^{-1}$ was subtracted with the absorbance value for the base line at 1850 $cm^{-1}$ ($A_{2660}-A_{1850}$). The ratio between ($A_{comonomer}-A_{1850}$) and ($A_{2660}-A_{1850}$) was then calculated. The NMR spectroscopy calibration procedure was undertaken in the conventional manner which is well documented in the literature, as described above under method 1).

The weight-% can be converted to mol-% by calculation. It is well documented in the literature.

DC Conductivity Determination Methods

DC Conductivity Method 1:

Electrical conductivity measured at 70° C. and 30 kV/mm mean electric field from a non-degassed or degassed, 1 mm plaque sample consisting of a crosslinked polymer composition.

The plaques are compression moulded from pellets of the test polymer composition. The final plaques have a thickness of 1 mm and a diameter of 330 mm.

The plaques are press-moulded at 130° C. for 12 min while the pressure is gradually increased from 2 to 20 MPa. Thereafter the temperature is increased and reaches 180° C. after 5 min. The temperature is then kept constant at 180° C. for 15 min during which the plaque becomes fully crosslinked by means of the peroxide present in the test polymer composition. Finally the temperature is decreased using the cooling rate 15° C./min until room temperature is reached when the pressure is released. The plaques are immediately after the pressure release wrapped in metallic foil in order to prevent loss of volatile substances (used for the non-degassed determination).

If the plaque is to be degassed it is placed in a vacuum oven at pressure less than 10 Pa and degassed for 24 h at 70° C. Thereafter the plaque is again wrapped in metallic foil in order to prevent further exchange of volatile substances between the plaque and the surrounding.

A high voltage source is connected to the upper electrode, to apply voltage over the test sample. The resulting current through the sample is measured with an electrometer. The measurement cell is a three electrodes system with brass electrodes. The brass electrodes are equipped with heating pipes connected to a heating circulator, to facilitate measurements at elevated temperature and provide uniform temperature of the test sample. The diameter of the measurement electrode is 100 mm. Silicone rubber skirts are placed between the brass electrode edges and the test sample, to avoid flashovers from the round edges of the electrodes.

The applied voltage was 30 kV DC meaning a mean electric field of 30 kV/mm. The temperature was 70° C. The current through the plaque was logged throughout the whole experiments lasting for 24 hours. The current after 24 hours was used to calculate the conductivity of the insulation.

This method and a schematic picture of the measurement setup for the conductivity measurements has been thoroughly described in a publication presented at the Nordic Insulation Symposium 2009 (Nord-IS 09), Gothenburg, Sweden, Jun. 15-17, 2009, page 55-58: Olsson et al, "Experimental determination of DC conductivity for XLPE insulation".

DC Conductivity Method 2:

Electrical conductivity at 20° C. and 40 kV/mm mean electric field from a plaque sample consisting of a crosslinked polymer composition Plaque Sample Preparation:

Pellets of the test polymer composition were compression moulded using the following conditions: First the pellets were melted at 120° C. for 1 min at 20 bars. Then the temperature was increased to 180° C. at the same time as the pressure was increased to 200 bars. The plaques then become fully crosslinked by means of the peroxide present in the polymer composition. The total crosslinking time was 12 min including the time for increasing the temperature from 120 to 180° C. After completed crosslinking the plaques were cooled to room temperature with a cooling rate of 15° C./min still under pressure. After removal from the press the cooled plaques were degassed in oven at 70° C. for 72 h at 1 atm. The final thickness of the plaques was 0.5 mm.

Conduction Current Measurement:

Conduction current measurement is performed by a three-terminal cell, in nitrogen at a pressure of 3 bar and temperature at 20° C. Specimens are tested with gold-coated electrodes obtained by cold sputtering. The low voltage electrode has a diameter of 25 mm (measurement area is thus 490 mm$^2$). A guard electrode is situated around, but separated from the low voltage electrode. The high voltage electrode has a diameter of 50 mm, the same dimension of the external diameter of the guard electrode.

A DC voltage (U) equal to target mean electric stress (E)× measured insulation thickness (d) is applied on the high voltage electrode. The target mean electric stress E is in this case 40 kV/mm. The current through the tape between the high voltage and the low voltage electrode is measured with an electrometer. The measurements are terminated when the current has reached a steady-state level, normally after 24-48 hours. The reported conductivity a is calculated from the steady-state current (I) by the equation $$\sigma = I*d/(A*U)$$

where A is the measurement area, in this case 490 mm$^2$.

DC Conductivity Method 3:

Electrical conductivity of a 5.5 mm model cable sample of the crosslinked test polymer composition as an insulation layer and the crosslinked test semiconductive composition as a semiconductive layer and measured at 70° C. and 27 kV/mm mean electric field Model Cable Preparation:

A three layered cable core was produced using a 1+2 construction on a pilot scale CCV line. The conductor was made of Aluminium and had an area of 50 mm$^2$. The inner and outer semiconductive layers consisted of the same test semiconductive composition comprising a crosslinking agent, which in the experimental part below was peroxide. The inner semiconductive layer was 1.0 mm thick, the insulation layer 5.5 mm thick and the outer semiconductive layer 0.8 mm thick. The line speed used for the manufacturing of the cable cores was 2 m/min. This CCV line has two heating zones for dry-curing (crosslinking under nitrogen), each of 3 m, and the temperatures used on these two zones were 450 and 400° C. respectively. The cooling section was 12.8 m long and the cable was cooled with water holding a temperature of around 25-30° C. Immediately after the production the cable core was tightly wrapped with an Aluminium foil (0.15 mm thick) to keep the peroxide by-products within the cable core.

The cable samples were stored at ambient temperature for eight weeks until they were thermally treated in an oven for 72 hours at 70° C. The cable cores were covered with the Al foil during the whole time, also during the thermal treatment and during the electrical measurements.

Conduction Current Measurement:

The measurements were then carried out in an oven at 70° C. by the use of a three-terminal cell where 150 kV DC voltage was applied on the conductor and the Aluminium foil was connected to the low voltage electrode. This corresponds to 27 kV/mm mean electric field (the ratio between applied voltage and insulation thickness). The test circuit consisted of a high voltage generator, an air insulated voltage divider, the test cable and its terminations, and a current meter and its amplifier. Also protection devices are included for the case of failures in the test circuit. The current meter is connected to the outer screen of the cable at each cable end and to ground. Guard electrodes were used in order to avoid leakage currents over the terminations from disturbing the measurements. The distance between the cable electrodes (the measurement zone) was 53 m and this cable section was placed inside the oven whereas the cable ends were located outside the oven.

The electric conductivity is calculated from the conduction current (leakage current) after 24 hours voltage application by using equations 1 and 2

The conductivity σ (S/m) has been calculated using the formula $$\sigma = \frac{\ln\left(\frac{D}{d}\right)}{2\pi L R} \qquad \text{Equation 1}$$

$$R = U/I = \text{Applied voltage (V)/leakage current (A)} \qquad \text{Equation 2}$$

L: Length of measurement zone (53 m)
U: Applied voltage (150 kV)
D and d: The outer and inner diameter of the insulation DC Conductivity Method 4:

Electrical conductivity of a 1.5 mm model cable sample of the crosslinked test polymer composition as an insulation layer and the crosslinked test semiconductive composition as a semiconductive layer and measured at 20° C. and 40 kV/mm mean electric field Model Cable Preparation:

Three layered cable cores were produced using a 1+2 construction on a pilot scale CCV line. The conductor was made of copper and had an area of 1.5 mm$^2$. The inner and outer semiconductive layers consisted of the same test semiconductive composition comprising a crosslinking agent, which in the experimental part below was peroxide. The inner semiconductive layer was 0.7 mm thick, the insulation layer 1.5 mm thick and the outer semiconductive layer 0.15 mm thick. The cable cores were produced in two steps. In step 1 the cable cores were extruded using a line speed of 8 m/min without passing through a vulcanisation tube. In step 2 the cable cores went only through the vulcanisation tube with a line speed of 5 m/min. The tube has two heating zones for dry-curing (crosslinking under nitrogen), each of 3 m, and the temperatures used on these two zones were 400 and 380° C. respectively. This resulted in fully crosslinked cables due to peroxide in the insulating and semiconductive materials. The cooling section was 12.8 m long and the cable was cooled with water holding a temperature of around 25-30° C.

The cables were degassed at 80° C. in a ventilated oven at atmospheric pressure for eight days. The cables were then cut into 1 meter long samples with 10 cm active length (measurement zone) in the middle where the outer semiconductive layer is present. The outer semiconductive layer in the 45 cm ends of the sample has been removed by a cutting tool.

The schematic view of the three-layer model cables with insulation thickness 1.5 mm used in method 4 is illustrated in FIG. 1.

Conduction Current Measurements:

Conduction current measurements are performed by a three-terminal cell where the conductor acts as the high voltage electrode. The low voltage electrode is an aluminium foil covering the outer semicon in the active part. Guard electrodes are introduced by aluminium foil covering the insulation on both sides of the measurements zone. The gaps between the low voltage electrode and the guard electrodes are 5 cm.

Applied voltage is 60 kV DC and the temperature 20° C. The measurements are terminated when the current has reached a steady-state level, normally after 24 hours. The steady-state current (the leakage current) is used in the calculations.

The conductivity s (S/m) has been calculated using the formula $$\sigma = \frac{\ln\left(\frac{D}{d}\right)}{2\pi LR}$$

And R=U/I=Applied voltage (V)/leakage current (A)

TABLE

Data used for the calculation of the conductivity from model cable specimens.

| | Parameter | Value |
|---|---|---|
| L | Cable length (m) | 0.1 |
| d | Inner diameter of insulation (mm) | 2.8 |
| D | Outer diameter of insulation (mm) | 5.8 |
| U | Applied voltage (kV) | 60 |

DC Conductivity Method 5:

Electrical conductivity of a 1.5 mm model cable sample of the crosslinked test polymer composition as an insulation layer and the crosslinked test semiconductive composition as a semiconductive layer and measured at 70° C. and 30 kV/mm mean electric field Model Cable Preparation:

Three layered cable cores were produced using a 1+2 construction on a pilot scale CCV line. The conductor was made of copper and had an area of 1.5 mm². The inner and outer semiconductive layers consisted of the same test semiconductive composition comprising a crosslinking agent, which in the experimental part below was peroxide. The inner semiconductive layer was 0.7 mm thick, the insulation layer 1.5 mm thick and the outer semiconductive layer 0.15 mm thick. The cable cores were produced in two steps. In step 1 the cable cores were extruded using a line speed of 8 m/min without passing through a vulcanisation tube. In step 2 the cable cores went only through the vulcanisation tube with a line speed of 5 m/min. The tube has two heating zones for dry-curing (crosslinking under nitrogen), each of 3 m, and the temperatures used on these two zones were 400 and 380° C. respectively. This resulted in fully crosslinked cables due to peroxide in the insulating and semiconductive materials. The cooling section was 12.8 m long and the cable was cooled with water holding a temperature of around 25-30° C.

The cables were not degassed prior to conduction current measurements. To avoid unwanted degassing to occur the cables were covered with Aluminium foil until the measurement were conducted. The cables were then cut into 3 meter long samples with 100 cm active length (measurement zone) in the middle where the outer semiconductive layer is present. The outer semiconductive layer in the 100 cm ends of the sample has been removed by a peeling tool. The schematic view of the three-layer model cables with insulation thickness 1.5 mm used in method 5 is illustrated in FIG. 1.

Conduction Current Measurements:

Conduction current measurements are performed by a three-terminal cell where the conductor acts as the high voltage electrode. The low voltage electrode is an aluminium foil covering the outer semicon in the active part. Guard electrodes are introduced by aluminium foil covering the insulation on both sides of the measurements zone. The gaps between the low voltage electrode and the guard electrodes are 5 cm.

Applied voltage is 45 kV DC (30 kV/mm mean electrical field) and the temperature 70° C. The measurements are terminated after 24 h and the conductivity is measured as the average between 23-24 h. The steady-state current (the leakage current) is used in the calculations.

The conductivity s (S/m) has been calculated using the formula $$\sigma = \frac{\ln\left(\frac{D}{d}\right)}{2\pi LR}$$

And R=U/I=Applied voltage (V)/leakage current (A)

TABLE

Data used for the calculation of the conductivity from model cable specimens.

| | Parameter | Value |
|---|---|---|
| L | Cable length (m) | 1 |
| d | Inner diameter of insulation (mm) | 2.8 |
| D | Outer diameter of insulation (mm) | 5.8 |
| U | Applied voltage (kV) | 45 |

DC Conductivity Method 6

Electrical conductivity measured at 70° C. and 30 kV/mm mean electric field from a non-degassed or degassed, 1 mm plaque sample consisting of a crosslinked polymer composition.

The plaques are compression moulded from pellets of the test polymer composition. The final plaques have a thickness of 1±10% mm and 195×195 mm². The thickness is measured at 5 different locations on the plaques.

The plaques are press-moulded at 130° C. for 600 s at 20 Bar. Thereafter the temperature is increased and reaches 180° C. after 170 s and the pressure is at the same time increased to 200 Bar. The temperature is then kept constant at 180° C. for 1000 s during which the plaque becomes fully crosslinked by means of the peroxide present in the test polymer composition. Finally the temperature is decreased using the cooling rate 15° C./min until room temperature is reached when the pressure is released. The plaque thickness is determined immediately after the compression moulding and thereafter placed in the test cell described below for conductivity measurement.

A high voltage source is connected to the upper electrode, to apply voltage over the test sample. The resulting current through the sample is measured with an electrometer. The measurement cell is a three electrodes system with brass electrodes. The cell is installed in a heating oven to facilitate measurements at elevated temperature and provide uniform temperature of the test sample. The diameter of the measurement electrode is 100 mm. Silicone rubber skirts are placed between the brass electrode edges and the test sample, to avoid flashovers from the round edges of the electrodes.

The applied HVDC-voltage was regulated according to the measured plaque thickness to reach to a mean electric field of 30 kV/mm. The temperature was 70° C. The current through the plaque was logged throughout the whole experiments lasting for 24 hours. The current after 24 hours was used to calculate the conductivity of the insulation.

Method for Determination of the Amount of Double Bonds in the Polymer Composition or in the Polymer A) Quantification of the Amount of Carbon-Carbon Double Bonds by IR Spectroscopy Quantitative infrared (IR) spectroscopy was used to quantify the amount of carbon-carbon doubles (C=C). Calibration was achieved by prior determination of the molar extinction coefficient of the C=C functional groups in representative low molecular weight model compounds of known structure.

The amount of each of these groups (N) was determined as number of carbon-carbon double bonds per thousand total carbon atoms (C=C/1000C) via:

$$N=(A\times 14)/(E\times L\times D)$$

were A is the maximum absorbance defined as peak height, E the molar extinction coefficient of the group in question ($l\cdot mol^{-1}\cdot mm^{-1}$), L the film thickness (mm) and D the density of the material ($g\cdot cm^{-1}$).

The total amount of C=C bonds per thousand total carbon atoms can be calculated through summation of N for the individual C=C containing components.

For polyethylene samples solid-state infrared spectra were recorded using a FTIR spectrometer (Perkin Elmer 2000) on compression moulded thin (0.5-1.0 mm) films at a resolution of 4 $cm^{-1}$ and analysed in absorption mode.

1) Polymer Compositions Comprising Polyethylene Homopolymers and Copolymers, Except Polyethylene Copolymers with >0.4 Wt % Polar Comonomer For polyethylenes three types of C=C containing functional groups were quantified, each with a characteristic absorption and each calibrated to a different model compound resulting in individual extinction coefficients:

vinyl (R—CH=CH2) via 910 $cm^{-1}$ based on 1-decene [dec-1-ene] giving E=13.13 $l\cdot mol^{-1}\cdot mm^{-1}$ vinylidene (RR'C=CH2) via 888 $cm^{-1}$ based on 2-methyl-1-heptene[2-methyhept-1-ene] giving E=18.24 $l\cdot mol^{-1}\cdot mm^{-1}$ trans-vinylene (R—CH=CH—R') via 965 $cm^{-1}$ based on trans-4-decene[(E)-dec-4-ene] giving E=15.14 $l\cdot mol^{-1}\cdot mm^{-1}$ For polyethylene homopolymers or copolymers with <0.4 wt % of polar comonomer linear baseline correction was applied between approximately 980 and 840 $cm^{-1}$.

2) Polymer Compositions Comprising Polyethylene Copolymers with >0.4 Wt % Polar Comonomer For polyethylene copolymers with >0.4 wt % of polar comonomer two types of C=C containing functional groups were quantified, each with a characteristic absorption and each calibrated to a different model compound resulting in individual extinction coefficients:

vinyl (R—CH=CH2) via 910 $cm^{-1}$ based on 1-decene [dec-1-ene] giving E=13.13 $l\cdot mol^{-1}\cdot mm^{-1}$ vinylidene (RR'C=CH2) via 888 $cm^{-1}$ based on 2-methyl-1-heptene[2-methyhept-1-ene] giving E=18.24 $l\cdot mol^{-1}\cdot mm^{-1}$

EBA:

For poly(ethylene-co-butylacrylate) (EBA) systems linear baseline correction was applied between approximately 920 and 870 $cm^{-1}$.

EMA:

For poly(ethylene-co-methylacrylate) (EMA) systems linear baseline correction was applied between approximately 930 and 870 $cm^{-1}$.

3) Polymer Compositions Comprising Unsaturated Low Molecular Weight Molecules

For systems containing low molecular weight C=C containing species direct calibration using the molar extinction coefficient of the C=C absorption in the low molecular weight species itself was undertaken.

B) Quantification of Molar Extinction Coefficients by IR Spectroscopy

The molar extinction coefficients were determined according to the procedure given in ASTM D3124-98 and ASTM D6248-98. Solution-state infrared spectra were recorded using a FTIR spectrometer (Perkin Elmer 2000) equipped with a 0.1 mm path length liquid cell at a resolution of 4 $cm^{-1}$.

The molar extinction coefficient (E) was determined as $l\cdot mol^{-1}\cdot mm^{-1}$ via:

$$E=A/(C\times L)$$

were A is the maximum absorbance defined as peak height, C the concentration ($mol\cdot l^{-1}$) and L the cell thickness (mm).

At least three 0.18 $mol\cdot l^{-1}$ solutions in carbondisulphide ($CS_2$) were used and the mean value of the molar extinction coefficient determined.

EXPERIMENTAL PART

Preparation of Polyolefins of the Examples of the Polymer Compositions of the Insulation Layer of the Present Invention and of the Reference Examples The polyolefins were low density polyethylenes produced in a high pressure reactor. The production of inventive and reference polymers is described below. As to CTA feeds, e.g. the PA content can be given as liter/hour or kg/h and converted to either units using a density of PA of 0.807 kg/liter for the recalculation.

Inventive Example 1

Ethylene with recycled CTA was compressed in a 5-stage precompressor and a 2-stage hyper compressor with intermediate cooling to reach initial reaction pressure of ca 2576 bar.

The total compressor throughput was ca 30 tons/hour. In the compressor area approximately 4.9 liters/hour of propion aldehyde (PA, CAS number: 123-38-6) was added together with approximately 119 kg propylene/hour as chain transfer agents to maintain an MFR of 2.1 g/10 min. The compressed mixture was heated to 166° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 276° C. after which it was cooled to approximately 221° C. The subsequent $2^{nd}$ and $3^{rd}$ peak reaction temperatures were 271° C. and 261° C. respectively with a cooling in between to 225° C. The reaction mixture was depressurised by a kick valve, cooled and polymer was separated from unreacted gas.

Inventive Example 2

Ethylene with recycled CTA was compressed in a 5-stage precompressor and a 2-stage hyper compressor with intermediate cooling to reach initial reaction pressure of ca 2523 bar. The total compressor throughput was ca 30 tons/hour. In the compressor area approximately 4.5 liters/hour of propion aldehyde was added together with approximately 118 kg propylene/hour as chain transfer agents to maintain an MFR of 2.0 g/10 min. Here also 1,7-octadiene was added to the reactor in amount of 23 kg/h. The compressed mixture was heated to 160° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 272° C. after which it was cooled to approximately 205° C. The subsequent $2^{nd}$ and $3^{rd}$ peak reaction temperatures were 270° C. and 253° C. respectively with a cooling in between to 218° C. The reaction mixture was depressurised by a kick valve, cooled and polymer was separated from unreacted gas.

Inventive Example 3

Ethylene with recycled CTA was compressed in a 5-stage precompressor and a 2-stage hyper compressor with intermediate cooling to reach initial reaction pressure of ca 2592 bar. The total compressor throughput was ca 30 tons/hour. In the compressor area approximately 4.9 liters/hour of propion aldehyde was added together with approximately 77 kg propylene/hour as chain transfer agents to maintain an MFR of 1.9 g/10 min. The compressed mixture was heated to 163° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 281° C. after which it was cooled to approximately 208° C. The subsequent $2^{nd}$ and $3^{rd}$ peak reaction temperatures were 282° C. and 262° C. respectively with a cooling in between to 217° C. The reaction mixture was depressurised by a kick valve, cooled and polymer was separated from unreacted gas.

Inventive Example 4

Ethylene with recycled CTA was compressed in a 5-stage precompressor and a 2-stage hyper compressor with intermediate cooling to reach initial reaction pressure of ca 2771 bar. The total compressor throughput was ca 30 tons/hour. In the compressor area approximately 5.3 liters/hour of propion aldehyde was added together with approximately 86 kg propylene/hour as chain transfer agents to maintain an MFR of 0.7 g/10 min. The compressed mixture was heated to 171° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 281° C. after which it was cooled to approximately 203° C. The subsequent $2^{nd}$ and $3^{rd}$ peak reaction temperatures were 273° C. and 265° C. respectively with a cooling in between to 226° C. The reaction mixture was depressurised by a kick valve, cooled and polymer was separated from unreacted gas.

Reference Example 1

Purified ethylene was liquefied by compression and cooling to a pressure of 90 bars and a temperature of −30° C. and split up into to two equal streams of roughly 14 tons/hour each. The CTA (methyl ethyl ketone (MEK)), air and a commercial peroxide radical initiator dissolved in a solvent were added to the two liquid ethylene streams in individual amounts. Here also 1,7-octadiene was added to the reactor in amount of 24 kg/h. The two mixtures were separately pumped through an array of 4 intensifiers to reach pressures of 2200-2300 bars and exit temperatures of around 40° C. These two streams were respectively fed to the front (zone 1) (50%) and side (zone 2) (50%) of a split-feed two-zone tubular reactor. The inner diameters and lengths of the two reactor zones were 32 mm and 200 m for zone 1 and 38 mm and 400 m for zone 2. MEK was added in amounts of 205 kg/h to the front stream to maintain a $MFR_2$ of around 2 g/10 min. The front feed stream was passed through a heating section to reach a temperature sufficient for the exothermal polymerization reaction to start. The reaction reached peak temperatures were 253° C. and 290° C. in the first and second zones, respectively. The side feed stream cooled the reaction to an initiation temperature of the second zone of 168° C. Air and peroxide solution was added to the two streams in enough amounts to reach the target peak temperatures. The reaction mixture was depressurized by product valve, cooled and polymer was separated from unreacted gas.

Reference Example 2

Purified ethylene was liquefied by compression and cooling to a pressure of 90 bars and a temperature of −30° C. and split up into to two equal streams of roughly 14 tons/hour each. The CTA (methyl ethyl ketone, MEK), air and a commercial peroxide radical initiator dissolved in a solvent were added to the two liquid ethylene streams in individual amounts. The two mixtures were separately pumped through an array of 4 intensifiers to reach pressures of 2100-2300 bars and exit temperatures of around 40° C. These two streams were respectively fed to the front (zone 1) (50%) and side (zone 2) (50%) of a split-feed two-zone tubular reactor. The inner diameters and lengths of the two reactor zones were 32 mm and 200 m for zone 1 and 38 mm and 400 m for zone 2. MEK was added in amounts of around 216 kg/h to the front stream to maintain a $MFR_2$ of around 2 g/10 min. The front feed stream was passed through a heating section to reach a temperature sufficient for the exothermal polymerization reaction to start. The reaction reached peak temperatures were around 250° C. and 318° C. in the first and second zones, respectively. The side feed stream cooled the reaction to an initiation temperature of the second zone of 165-170° C. Air and peroxide solution was added to the two streams in enough amounts to reach the target peak temperatures. The reaction mixture was depressurized by product valve, cooled and polymer was separated from unreacted gas.

Reference Example 3

Purified ethylene was liquefied by compression and cooling to a pressure of 90 bars and a temperature of −30° C. and split up into to two equal streams of roughly 14 tons/hour each. The CTA (methyl ethyl ketone, MEK), air and a commercial peroxide radical initiator dissolved in a solvent were added to the two liquid ethylene streams in individual amounts. The two mixtures were separately pumped through an array of 4 intensifiers to reach pressures of 2100-2300 bars and exit temperatures of around 40° C. These two streams were respectively fed to the front (zone 1) (50%) and side (zone 2) (50%) of a split-feed two-zone tubular reactor. The inner diameters and lengths of the two reactor zones were 32 mm and 200 m for zone 1 and 38 mm and 400 m for zone 2. MEK was added in amounts of around 201 kg/h to the front stream to maintain a MFR$_2$ of around 0.75 g/10 min. The front feed stream was passed through a heating section to reach a temperature sufficient for the exothermal polymerization reaction to start. The reaction reached peak temperatures were around 251° C. and 316° C. in the first and second zones, respectively. The side feed stream cooled the reaction to an initiation temperature of the second zone of around 185-190° C. Air and peroxide solution was added to the two streams in enough amounts to reach the target peak temperatures. The reaction mixture was depressurized by product valve, cooled and polymer was separated from unreacted gas.

Semiconductive compositions for semiconductive layers of the model cable samples Semicon 1

LE0500, commercial grade from Borealis with acetylene carbon black, density 1120 kg/cm$^3$, DC volume resistivity at 23° C. less than 100 Ωcm and at 90° C. less than 1000 Ωcm (ISO3915), Hot Set Test (200° C., 0.20 MPa, IEC 60811-2-1): Elongation under load 25%, Permanent deformation 0%.

Semicon 2

LE0550, commercial grade from Borealis with acetylene carbon black, density 1100 kg/cm$^3$, DC volume resistivity at 23° C. less than 100 Ωcm and at 90° C. less than 1000 Ωcm (ISO3915), Hot Set Test (200° C., 0.20 MPa, IEC 60811-2-1): Elongation under load 25%, Permanent deformation 0%. Göttfert Elastograph 1.2 Nm.

Semicon 3:

LE0592, commercial grade from Borealis with furnace carbon black, density 1135 kg/cm$^3$, DC volume resistivity at 23° C. less than 100 Ωcm and at 90° C. less than 1000 Ωcm (ISO3915). Hot Set Test (200° C., 0.20 MPa, IEC 60811-2-1): Elongation under load 25%, Permanent deformation 0%.

Göttfert Elastograph 1.14-1.38 Nm

Experimental Results:

Mineral oil=Inventive examples 1-3: mineral oil based lubricant, Shell Corena E150, supplier Shell; Inventive example 4: mineral oil based lubricant, M-RARUS PE KPL 201, supplier ExxonMobil PAG=References: polyalkylene glycol based lubricant, Syntheso D201N, supplier Klueber.

MEK=methyl ethyl ketone

PA=propion aldehyde (CAS number: 123-38-6)

TABLE 1

Summary and components of the Polymer compositions of the insulation layer

| Polymer composition | Compressor lubricant used in the polymerisation process | Comonomer | AO (wt %) | Peroxide mmol —O—O—/kg polymer composition, (wt %) | ADD (wt %) |
|---|---|---|---|---|---|
| Reference example 1 | PAG | 1,7-octadiene | 0.08 | 49.9 (1.35) | 0.35 |
| Reference example 2 | PAG | No comonomer | 0.19 | 77.7 (2.10) | — |
| Reference example 3 | PAG | No comonomer | 0.19 | 70.2 (1.9) | — |
| Inventive example 1 | Mineral oil | No comonomer | 0.19 | 66.6 (1.80) | — |
| Inventive example 2 | Mineral oil | 1,7-octadiene | 0.08 | 42.5 (1.15) | 0.29 |
| Inventive example 3 | Mineral oil | No comonomer | 0.19 | 74.0 (2.0) | — |
| Inventive example 4 | Mineral oil | No comonomer | 0.07 | 48.8 (1.32) | 0.26 |

AO: 4,4'-thiobis (2-tertbutyl-5-methylphenol) (CAS no. 96-69-5)

Peroxide: Dicumylperoxide (CAS no. 80-43-3)

ADD (Additive): 2,4-Diphenyl-4-methyl-1-pentene (CAS 6362-80-7)

TABLE 2

Properties of the polyolefin components of the Polymer composition

| Base Resin Properties | Inv. ex. 1 | Inv. ex. 2 | Inv. ex. 3 | Inv. ex 4 | Ref. ex. 1 | Ref. ex. 2 | Ref. ex3 |
|---|---|---|---|---|---|---|---|
| MFR 2.16 kg, 190° C. [g/10 min] | 2.1 | 2.0 | 1.9 | 0.7 | 2.0 | 2.0 | 0.75 |
| Density [kg/m$^3$] | 922 | 920 | 921 | 922 | 922 | 922 | 922 |
| Vinyl [C=C/1000 C.] | 0.37 | 0.56 | 0.25 | 0.26 | 0.25 | 0.11 | 0.11 |
| Vinylidene [C=C/1000 C.] | 0.17 | 0.19 | 0.20 | 0.16 | 0.26 | 0.22 | 0.22 |
| Trans-vinylene [C=C/1000 C.] | 0.04 | 0.07 | 0.04 | 0.04 | 0.06 | 0.05 | 0.04 |

TABLE 3

Conductivity (fS/m) of 1 mm pressmoulded plaques of crosslinked Polymer composition of the insulation measured at 70° C. and 30 kV/mm mean electric field (DC conductivity Method 1)

| By-products in sample | Reference example 1 | Inventive example 2 |
|---|---|---|
| No degassing | 166 (fS/m) | 67 (fS/m) |
| Degassed | 77 (fS/m) | 14 (fS/m) |

TABLE 4

Conductivity of 0.5 mm pressmoulded plaques of crosslinked Polymer composition of the insulation measured at 20° C. and 40 kV/mm. (DC conductivity Method 2)

| Code Polymer composition | Compressor lubricant | Comonomer | Conductivity (fS/m) |
|---|---|---|---|
| Reference example 1 | PAG | 1,7-octadiene | 0.30 |
| Inventive example 1 | Mineral oil | No comonomer | 0.20 |
| Inventive example 2 | Mineral oil | 1,7-octadiene | 0.10 |

TABLE 5

Cable compositions and test results for the 5.5 mm model cables measured at 70° C. and 27 kV/mm mean electric field. (DC conductivity Method 3)

| Polymer composition of the insulation layer of the model cable sample | Compressor lubricant used in the polymerisation process of the polymer composition of the insulation layer of the model cable sample | Semiconductive Composition of the inner and outer semiconductive layer of the model cable sample | Conductivity measured from a model cable sample (fS/m) |
|---|---|---|---|
| Reference example 1 | PAG | Semicon 2: Acetylene black (LE0550) | 1381 |
| Inventive example 2 | Mineral oil | Semicon 2: Acetylene black (LE0550) | 295 |

TABLE 6

Cable compositions and test results for 1.5 mm model cables measured at 20° C. and 40 kV/mm mean electric field. (DC conductivity Method 4)

| Polymer composition of the insulation layer of the model cable sample | Compressor lubricant used in the polymerisation process of the polymer composition of insulation layer of the model cable sample | Semiconductive Composition of the inner and outer semiconductive layer of the model cable sample | Conductivity measured from a model cable sample (fS/m) |
|---|---|---|---|
| Reference example 1 | PAG | Semicon 1: Acetylene black (LE0500) | 0.17 |
| Inventive example 2 | Mineral oil | Semicon 1: Acetylene black (LE0500) | 0.058 |
| Inventive example 2 | Mineral oil | Semicon 2: Acetylene black (LE0550) | 0.12 |
| Inventive example 2 | Mineral oil | Semicon 3: Furnace black (LE0592) | 0.10 |
| Reference example 2 | PAG | Semicon 1: Acetylene black (LE0500) | 0.23 |
| Inventive example 3 | Mineral oil | Semicon 1: Acetylene black (LE0500) | 0.077 |

TABLE 7

Cable compositions and test results for 1.5 mm model cables measured at 70° C. and 30 kV/mm mean electric field. (DC conductivity Method 5)

| Polymer composition of the insulation layer of the model cable sample | Compressor lubricant used in the polymerisation process of the polymer composition of insulation layer of the model cable sample | Semiconductive Composition of the inner and outer semiconductive layer of the model cable sample | Conductivity measured from a model cable sample (fS/m) |
|---|---|---|---|
| Reference example 3 | PAG | Semicon 2: Acetylene black (LE0550) | 450.1 |
| Inventive example 4 | Mineral oil | Semicon 2: Acetylene black (LE0550) | 72.6 |

TABLE 8

Conductivity (fS/m) of 1 mm pressmoulded plaques of crosslinked Polymer composition of the insulation measured at 70° C. and 30 kV/mm mean electric field (DC conductivity Method 6)

| By-products in sample | Reference example 3 (fS/m) | Inventive example 4 (fS/m) |
|---|---|---|
| No degassing | 160.1 (fS/m) | 65.6 (fS/m) |

What is claimed is:

1. A power cable comprising a conductor surrounded by at least one semiconductive layer and an insulation layer, in any order, wherein
   the semiconductive layer comprises a semiconductive composition comprising a polyethylene and carbon black, and
   the insulation layer is crosslinkable and comprises a polymer composition comprising a polyolefin, wherein
   (i) the polymer composition of the insulation layer has an electrical conductivity of 150 fS/m or less, when measured at 70° C. and 30 kV/mm mean electric field from a non-degassed, 1 mm thick plaque sample consisting of a crosslinked polymer composition according to DC conductivity method (1) as described under "Determination methods", and
   wherein the polyolefin of the polymer composition of the insulation layer is produced in a high pressure process comprising
   (a) compressing one or more monomer(s) under pressure in a compressor, wherein a compressor lubricant is used for lubrication,
   (b) polymerizing a monomer optionally together with one or more comonomer(s) in a polymerization zone,
   (c) separating the obtained polyolefin from the unreacted products and recovering the separated polyolefin in a recovery zone, wherein in step a) the compressor lubricant comprises a mineral oil.

2. The cable of claim 1, wherein the polymer composition of the insulation layer has (i) an electrical conductivity of 140 fS/m or less, when measured at 70° C. and 30 kV/mm mean electric field from a non-degassed, 1 mm thick plaque sample consisting of a crosslinked polymer composition according to DC conductivity method (1) as described under "Determination methods".

3. The cable of claim 1, wherein (ii) the polymer composition of the insulation layer comprises an electrical conductivity of 1300 fS/m or less, when determined from a model cable sample of the polymer composition as an insulation layer of a thickness of 5.5 mm and of the semiconductive composition as a semiconductive layer, and measured at 70° C. and 27 kV/mm mean electric field according to DC conductivity method (3) as described under "Determination methods".

4. The cable of claim 1, wherein the Polymer composition of the insulation layer comprises:
   (ii) an electrical conductivity of 1000 fS/m or less, when determined from a model cable sample of the polymer composition as an insulation layer of a thickness of 5.5 mm and the semiconductive composition as a semiconductive layer, and measured at 70° C. and 27 kV/mm mean electric field according to DC conductivity method (3) as described under "Determination methods".

5. The cable of claim 1, wherein at least the polymer composition of the insulation layer contains a crosslinking agent.

6. The cable of claim 1, wherein the polymer composition of the insulation layer is crosslinked in the presence of a crosslinking agent before the end use of the cable.

7. The cable of claim 1, wherein the polymer composition of the insulation layer contains further additive(s) comprising one or more antioxidant(s) and optionally one or more scorch retarder(s), or any mixtures thereof.

8. The cable of claim 1, wherein the antioxidant(s) is selected from the group consisting of sterically hindered or semi-hindered phenols, aromatic amines, aliphatic sterically hindered amines, organic phosphites or phosphonites, thio compounds, and mixtures thereof; and
   wherein the optional scorch retarder(s) is selected from the group consisting of allyl compounds, substituted or unsubstituted diphenylethylenes, quinone derivatives, hydroquinone derivatives, monofunctional vinyl containing esters and ethers, monocyclic hydrocarbons having at least two or more double bonds, and mixtures thereof.

9. The cable of claim 1, wherein the carbon black of the semiconductive layer is selected from a conductive carbon black.

10. The cable of claim 1, wherein the mineral oil is a white mineral oil which meets the requirements given for white mineral oil in European Directive 2002/72/EC of 6 Aug. 2002, Annex V, for plastics used in food contact.

11. The cable according to claim 1, wherein the polyolefin of the polymer composition of the insulation layer is a low density polyethylene (LDPE) selected from a LDPE homopolymer or LDPE copolymer of ethylene with one or more comonomer(s), which LDPE homopolymer or LDPE copolymer of ethylene may optionally be unsaturated.

12. The cable according to claim 1, wherein the polyolefin of the polymer composition of the insulation layer is an unsaturated low density polyethylene (LDPE) selected from an unsaturated LDPE homopolymer or an unsaturated LDPE copolymer of ethylene with one or more comonomer(s).

13. The cable according to claim 1, which is a power cable comprising a further semiconductive layer which comprises a semiconductive composition with carbon black, wherein said cable is a cable comprising a conductor surrounded by at least an inner semiconductive layer, an insulation layer and an outer semiconductive layer, in that order.

14. The cable according to claim 13, wherein the inner semiconductive layer comprises said at least one semiconductive layer and the further semiconductive layer is the outer semiconductive layer.

15. A process for producing a cable according to claim 1, comprising applying on a conductor at least a semiconductive layer comprising said semiconductive composition and an insulation layer comprising said polymer composition, in any order.

16. The process according to claim 15, comprising:
   (a) providing said semiconductive composition and mixing the semiconductive composition optionally together with further component(s),
   (b) providing said polymer composition and mixing the polymer composition optionally together with further component(s),
   (c) applying on a conductor,
      a meltmix of the semiconductive composition obtained from (a) to form a semiconductive layer,
      a meltmix of the polymer composition obtained from (b) to form the insulation layer; and
   (d) optionally crosslinking at least one layer of the obtained cable.

17. The process according to claim 15, wherein the cable comprises a conductor surrounded by an inner semiconductive layer, an insulation layer, and an outer semiconductive layer, in that order, the process comprising:
   (a) providing said semiconductive composition and melt-mixing the semiconductive composition, (b) providing said polymer composition and meltmixing the polymer composition,
(c) applying on a conductor,
 a meltmix of Semiconductive composition obtained from (a) to form at least the inner semiconductive layer,
 a meltmix of Polymer composition obtained from (b) to form the insulation layer, and
(d) optionally crosslinking at least one layer of the obtained cable at crosslinking conditions.

18. The process according to claim 15, wherein the process comprises (d) crosslinking at least the insulation layer.

19. A crosslinked cable obtainable by the process of claim 15.

20. The cable of claim 1, wherein the cable is a direct current (DC) power cable.

21. The cable of claim 1 wherein the polyolefin of the insulation layer comprises the mineral oil.

22. The cable of claim 21, wherein the mineral oil is present in maximum of up to 0.4 wt % based on an amount of the polyolefin.

* * * * *